(12) United States Patent
Cohen

(10) Patent No.: US 12,228,268 B2
(45) Date of Patent: Feb. 18, 2025

(54) LIGHTING JUNCTION BOX

(71) Applicant: Brandon Cohen, Vernon, CA (US)

(72) Inventor: Brandon Cohen, Vernon, CA (US)

(73) Assignee: AMP Plus, Inc., Vernon, CA (US)

( * ) Notice: Subject to any disclaimer, the term of this patent is extended or adjusted under 35 U.S.C. 154(b) by 437 days.

(21) Appl. No.: 17/505,563

(22) Filed: Oct. 19, 2021

(65) Prior Publication Data

US 2022/0034488 A1    Feb. 3, 2022

Related U.S. Application Data

(63) Continuation-in-part of application No. 17/106,048, filed on Nov. 27, 2020, now Pat. No. 11,725,805, and
(Continued)

(51) Int. Cl.
*H02G 3/08*     (2006.01)
*F21V 21/03*    (2006.01)
*H02G 3/12*     (2006.01)

(52) U.S. Cl.
CPC ............. *F21V 21/03* (2013.01); *H02G 3/121* (2013.01)

(58) Field of Classification Search
CPC .......... H02G 3/08; H02G 3/081; H02G 3/083; H02G 3/12; H02G 3/121; H02G 3/126;
(Continued)

(56) References Cited

U.S. PATENT DOCUMENTS 1,133,535 A    3/1915  Cain
1,471,340 A    10/1923 Knight
(Continued)

FOREIGN PATENT DOCUMENTS

EP          3521688 A1    7/2019
WO    WO2010051985 A1    5/2010
(Continued)

OTHER PUBLICATIONS

US 10,816,169 B1, 10/2020, Danesh (withdrawn)
(Continued)

*Primary Examiner* — Angel R Estrada
(74) *Attorney, Agent, or Firm* — Eric Kelly

(57) ABSTRACT

A lighting-junction-box-assembly-for-remodel (hereinafter, "assembly") has a lighting-junction-box, leg-springs attached to the lighting-junction-box, and mounting-tabs attached to the lighting-junction-box. The leg-springs are used to (temporarily) hold (by friction) the assembly within a hole in an existing ceiling, sized to fit the assembly. While the leg-springs are (temporarily) holding the assembly within the hole in the existing ceiling, other/different holes within extension-portions of the mounting-tabs are used to secure the entire assembly to the existing ceiling, via mechanical fasteners passing through the extension-portion holes and into the existing ceiling. An existing ceiling may be retrofitted with this assembly to have a lighting-junction-box where desired/needed in that existing ceiling; and as such, this assembly is particularly useful in remodeling situations (applications); however, the assembly may also be used in new construction.

20 Claims, 15 Drawing Sheets

Related U.S. Application Data a continuation-in-part of application No. 16/790,345, filed on Feb. 13, 2020, now Pat. No. 11,460,157.

(58) Field of Classification Search
CPC ...... H02G 3/125; H02G 3/10; H05K 5/00; H05K 5/02; H05K 5/0204; H05K 5/0217; F21V 21/04; F21V 21/042; F21V 21/048
USPC ....... 174/50, 480, 481, 53, 57, 58, 535, 542, 174/560, 559, 54, 61, 63; 220/3.2–3.9, 220/4.02; 248/906, 343, 317, 342
See application file for complete search history.

(56) References Cited

U.S. PATENT DOCUMENTS

| | | |
|---|---|---|
| 1,856,356 A | 5/1932 | Owen |
| 2,352,913 A | 7/1944 | Parker |
| 2,758,810 A | 8/1956 | Good |
| 2,802,933 A | 8/1957 | Broadwin |
| 3,104,087 A | 9/1963 | Budnick |
| 3,773,968 A | 11/1973 | Copp |
| 3,913,773 A | 10/1975 | Copp |
| 4,450,512 A | 5/1984 | Kristofek |
| 4,673,149 A * | 6/1987 | Grote .............. E04B 9/006 248/343 |
| 4,733,339 A | 3/1988 | Keldall |
| 4,880,128 A | 11/1989 | Jorgensen |
| 4,919,292 A | 4/1990 | Hsu |
| 5,009,383 A * | 4/1991 | Chapman .............. F21V 21/04 248/57 |
| 5,206,464 A * | 4/1993 | Lamm .............. H04R 1/025 181/150 |
| 5,303,894 A | 4/1994 | Deschamps |
| 5,420,376 A | 5/1995 | Rajecki |
| 5,609,414 A * | 3/1997 | Caluori .............. F21S 8/02 248/343 |
| 5,931,432 A * | 8/1999 | Herold .............. F21V 21/04 248/906 |
| 5,957,573 A | 9/1999 | Wedekind |
| 6,521,833 B1 | 2/2003 | DeFreitas |
| 6,967,284 B1 | 11/2005 | Gretz |
| 7,170,003 B2 | 1/2007 | Fields |
| 7,586,039 B1 | 9/2009 | Gretz |
| 7,673,842 B2 | 3/2010 | Nevers |
| 7,784,754 B2 | 8/2010 | Nevers |
| 7,857,275 B2 | 12/2010 | de la Borbolla |
| 7,950,832 B2 | 5/2011 | Tanaka |
| 8,235,549 B2 | 8/2012 | Gingrich, III |
| 8,308,322 B2 * | 11/2012 | Santiago .............. F21V 21/048 220/477 |
| 8,322,897 B2 | 12/2012 | Blincoe |
| 8,545,063 B2 * | 10/2013 | Dupuy .............. F21V 21/04 362/404 |
| 8,545,064 B2 | 10/2013 | Blincoe |
| 8,575,483 B2 * | 11/2013 | Gauthier .............. H02G 3/121 174/53 |
| D704,875 S | 5/2014 | Johnson |
| 8,845,144 B1 | 9/2014 | Davis |
| 8,926,133 B2 | 1/2015 | Booth |
| 9,039,254 B2 | 5/2015 | Danesh |
| 9,151,457 B2 | 10/2015 | Pickard |
| 9,404,639 B2 | 8/2016 | Bailey |
| 9,523,493 B2 | 12/2016 | Chen |
| 9,605,842 B1 | 3/2017 | Davis |
| 9,673,597 B2 | 6/2017 | Lee |
| 9,696,021 B2 | 7/2017 | Wronski |
| 9,797,562 B2 | 10/2017 | Dabiet |
| 9,854,642 B2 | 12/2017 | Kashani |
| 9,890,942 B2 | 2/2018 | Lin |
| 9,945,548 B2 | 4/2018 | Williams |
| 9,964,266 B2 | 5/2018 | Danesh |
| 10,072,805 B2 | 9/2018 | Bailey |
| D832,218 S | 10/2018 | Wronski |
| 10,103,533 B1 * | 10/2018 | Gretz .............. H02G 3/26 |
| D833,977 S | 11/2018 | Danesh |
| 10,139,059 B2 | 11/2018 | Danesh |
| 10,244,607 B1 | 3/2019 | Kashani |
| D847,414 S | 4/2019 | Danesh |
| D847,415 S | 4/2019 | Danesh |
| 10,247,390 B1 | 4/2019 | Kopitzke |
| D848,375 S | 5/2019 | Danesh |
| D851,046 S | 6/2019 | Peng |
| 10,378,738 B1 | 8/2019 | Davis |
| 10,408,395 B2 | 9/2019 | Danesh |
| 10,408,396 B2 | 9/2019 | Wronski |
| D864,877 S | 10/2019 | Danesh |
| 10,488,000 B2 | 11/2019 | Danesh |
| 10,551,044 B2 | 2/2020 | Peng |
| 10,563,850 B2 | 2/2020 | Danesh |
| D877,957 S | 3/2020 | Kopitzke |
| 10,591,120 B2 | 3/2020 | Bailey |
| 10,609,785 B1 | 3/2020 | Fardadi |
| 10,616,968 B2 | 4/2020 | Wang |
| 10,663,127 B2 | 5/2020 | Danesh |
| 10,663,153 B2 | 5/2020 | Nikooyan |
| 10,753,558 B2 | 8/2020 | Danesh |
| 10,805,997 B2 | 10/2020 | Wang |
| 10,816,148 B2 | 10/2020 | Danesh |
| D901,398 S | 11/2020 | Danesh |
| D902,871 S | 11/2020 | Danesh |
| D903,605 S | 12/2020 | Danesh |
| D905,327 S | 12/2020 | Williams |
| D907,284 S | 1/2021 | Danesh |
| 10,975,570 B2 | 4/2021 | Shen |
| 10,982,829 B2 | 4/2021 | Danesh |
| 10,989,390 B2 | 4/2021 | Lotfi |
| 11,022,259 B2 | 6/2021 | Bailey |
| 11,028,982 B2 | 6/2021 | Danesh |
| 11,047,538 B2 | 6/2021 | Danesh |
| D924,467 S | 7/2021 | Danesh |
| D925,109 S | 7/2021 | Danesh |
| 11,060,705 B1 | 7/2021 | Danesh |
| 11,067,231 B2 | 7/2021 | Lotfi |
| 11,085,597 B2 | 8/2021 | Danesh |
| 11,118,768 B2 | 9/2021 | Danesh |
| 11,622,179 B2 * | 4/2023 | Christie .............. H04R 1/028 181/150 |
| 11,725,805 B2 * | 8/2023 | Cohen .............. F21S 8/026 362/147 |
| 2014/0254177 A1 | 9/2014 | Danesh |
| 2015/0009676 A1 | 1/2015 | Danesh |
| 2015/0233556 A1 | 8/2015 | Danesh |
| 2015/0276185 A1 | 10/2015 | Bailey |
| 2016/0312987 A1 | 10/2016 | Danesh |
| 2016/0348860 A1 | 12/2016 | Bailey |
| 2016/0348861 A1 | 12/2016 | Bailey |
| 2017/0005460 A1 | 1/2017 | Lee |
| 2017/0045213 A1 | 2/2017 | Williams |
| 2017/0138576 A1 | 5/2017 | Peng |
| 2017/0167672 A1 | 6/2017 | Stauner |
| 2017/0167699 A1 | 6/2017 | Schubert |
| 2017/0290129 A1 | 10/2017 | Kashani |
| 2018/0231197 A1 | 8/2018 | Danesh |
| 2018/0372284 A1 | 12/2018 | Danesh |
| 2019/0049080 A1 | 2/2019 | Danesh |
| 2019/0063701 A1 | 2/2019 | Lotfi |
| 2019/0093836 A1 | 3/2019 | Danesh |
| 2019/0394849 A1 | 12/2019 | Wang |
| 2020/0056752 A1 | 2/2020 | Danesh |
| 2020/0116340 A1 | 4/2020 | Nikooyan |
| 2020/0158302 A1 | 5/2020 | Danesh |
| 2020/0232624 A1 | 7/2020 | Lotfi |
| 2020/0236755 A1 | 7/2020 | Wang |
| 2020/0291652 A1 | 9/2020 | Shen |
| 2020/0348000 A1 | 11/2020 | Bailey |
| 2020/0386375 A1 | 12/2020 | Danesh |
| 2020/0393118 A1 | 12/2020 | Danesh |
| 2021/0010647 A1 | 1/2021 | Danesh |
| 2021/0010663 A1 | 1/2021 | Nikooyan |
| 2021/0033268 A1 | 2/2021 | Danesh |
| 2021/0041070 A1 | 2/2021 | Danesh |

(56) References Cited

U.S. PATENT DOCUMENTS

| | | | |
|---|---|---|---|
| 2021/0071836 | A1 | 3/2021 | Danesh |
| 2021/0080084 | A1 | 3/2021 | Danesh |
| 2021/0262650 | A1 | 8/2021 | Danesh |

FOREIGN PATENT DOCUMENTS

| | | | |
|---|---|---|---|
| WO | WO2018237294 | A2 | 12/2018 |
| WO | WO2018237294 | A3 | 12/2018 |
| WO | WO2019046310 | A1 | 3/2019 |
| WO | WO2019133669 | A1 | 7/2019 |
| WO | WO2019222259 | A1 | 11/2019 |
| WO | WO2019241198 | A1 | 12/2019 |
| WO | WO2021051101 | A1 | 3/2021 |

OTHER PUBLICATIONS

US 10,969,069 B2, 04/2021, Danesh (withdrawn)

Carlon B618R-UPC 4-1/4"Round Box, Old Work, Cubic Inches: 18", Non-Metallic; offered from Amazon; https://www.amazon.com/Carlon-B618R-UPC-Round-Cubic-Inches/dp/B07DMSL9HV/ref=asc_df_B07DMSL9HV/?tag=hyprod-20&linkCode=df0&hvadid=241986552631&hvpos=&hvnetw=g&hvrand=12644386809842065758&hvpone=&hvptwo=&hvqmt=&hvdev=c&hvdvcmdl=&hvlocint=&hvlocphy=9031024&hvtargid=pla-1213028159021&psc=1 (last visited on Oct. 6, 2021).

Carlon BH614R Supblu Old Work Ceiling Box; offered from www.gordonelectricsupply.com; https://www.gordonelectricsupply.com/p/Carlon-Bh614R-Supblu-Old-Wrk-Clg-Bx/5997865?gclid=CjwKCAjwkvWKBhB4EiwA-GHjFq-mxFhqTulgHyQLU-W4tuoO7F80XI-Z3wCIh3h9MbWIQKfY1HAVThoCfIQQAvD_BwE (last visited on Oct. 6, 2021).

"Old Work" Ceiling Box; https://www.google.com/imgres?imgurl=https%3A%2F%2Fi.ytimg.com%2Fvi%2F5co-A4v3sNo%2Fmaxresdefault.jpg&imgrefurl=https%3A%2F%2Fwww.youtube.com%2Fwatch%3Fv%3D5co-A4v3sNo&tbnid=_Z06DXBUzlh6TM&vet=12ahUKEwiJyLvGvLbzAhWYsZ4KHZXcBpMQMygCegUIARDpAQ...i&docid=BOogDMbDBMfn4M&w=1280&h=720&q=remodel%20ceiling%20lighting%20junction%20box&ved=2ahUKEwiJyLvGvLbzAhWYsZ4KHZXcBpMQMygCegUIARDpAQ (last visited on Oct. 6, 2021).

https://www.google.com/imgres?imgurl=https%3A%2F%2Fm.media-amazon.com%2Fimages%2FI%2F61hhEHfMogL._AC_SS450_.jpg&imgrefurl=https%3A%2F%2Fwww.amazon.com%2FRound-Electrical-Box-Unfinished-Galvanized%2Fdp%2FB07LH4F7MV&tbnid=1gTxlb7LeqYWSM&vet=10CC4QMyh7ahcKEwio0lvavLbzAhUAAAAAHQAAAAAQBQ...i&docid=2yoTAB17B6vT-M&w=450&h=450&q=remodel%20ceiling%20lighting%20junction%20box&ved=0CC4QMyh7ahcKEwio0lvavLbzAhUAAAAAHQAAAAAQBQ (last visited on Oct. 6, 2021).

DMF DRD2 Product Publicly available at least as early as Sep. 6, 2018 Website: https://www.dmflighting.com/product/drd2/.

DMF DRD4 Product Publicly available at least as early as Sep. 6, 2018 Website: https://www.dmflighting.com/product/drd4/.

ELCO E247 Product Publicly available at least as early as Sep. 6, 2018 See attached concurrently filed NPL document with two product images of this ELCO E247 Product.

IMTRA Tide PowerLED Light Fixture See: https://www.imtra.com/1806fa8d-4593-40f4-bbf0-f9a833e92148/lighting-light-fixtures-detail.htm Publicly available at least as early as 2012.

ELCO 4" Round LED Reflector Insert Publicly available at least as early as Mar. 23, 2021 Website: https://elcolighting.com/products/4-round-led-reflector-insert.

ELCO 4" Five-Color Temperature Switch LED Reflector Inserts Publicly available at least as early as Mar. 23, 2021 Website: https://elcolighting.com/node/1432026.

MaxLite Publicly available at least as early as Mar. 23, 2021 Website: https://www.maxlite.com/news-and-events/2021/02/05/maxlite-introduces-canless-commercial-downlights-with-field-selectable-wattages-and-ccts/and.

SORAA Vivid MR16—GU10; https://www.soraa.com/products/19-MR16-GU10.php (last visited Nov. 9, 2021).

\* cited by examiner

LIGHTING JUNCTION BOX

PRIORITY NOTICE

The present patent application is a continuation-in-part (CIP) of U.S. non-provisional patent application Ser. No. 17/106,048 filed on Nov. 20, 2020, and claims priority to said U.S. non-provisional patent application under 35 U.S.C. § 120. The above-identified patent application is incorporated herein by reference in its entirety as if fully set forth below.

The present patent application is a continuation-in-part (CIP) of U.S. non-provisional patent application Ser. No. 16/790,345 filed on Feb. 13, 2020, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to junction boxes and more specifically to lighting junction boxes with additional structures that are configured for installing such lighting junction boxes into existing ceilings (e.g., for remodeling purposes).

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

During remodeling applications (scenarios), such as with respect to changing and/or adding in lighting to a given room and/or to a given ceiling covered area, it is often desirable to provide lighting from the existing ceiling. At the very least, this often entails cutting a hole into the existing ceiling from a bottom surface of the existing ceiling, such that the newly formed hole in the existing ceiling may then receive a lighting junction box within that newly formed hole. Most existing ceiling mounted lighting junction boxes may only be installed in relative close proximity to some other supporting structures, aside from the ceiling (e.g., drywall) itself, such as ceiling joists and/or roof rafters. However, often there may be a need and/or desire to locate a ceiling light in an area of the given existing ceiling that is not in relative close proximity to such other supporting structures. And in those situations, it may be desirable to have a new/novel lighting junction box that may be installed and mounted directly to the ceiling itself and not to the other supporting structures.

Further, during the installation operations of such a new/novel lighting junction box into the existing ceiling, it may be desirable for that new/novel lighting junction box to have means to at least temporarily hold up that new/novel lighting junction box within the newly formed ceiling cutout, while more permanent/secure attachment operations are carried out to securely attach that new/novel lighting junction box to the existing ceiling.

There is a need in the art for such a new/novel lighting junction box that may be installed directly to the existing ceiling itself and that has means for at least temporarily holding up that new/novel lighting junction box within a newly formed ceiling cutout, while more permanent/secure attachment operations are carried out to securely attach that new/novel lighting junction box to the existing ceiling.

It is to these ends that the present invention has been developed.

BRIEF SUMMARY OF THE INVENTION

To minimize the limitations in the prior art, and to minimize other limitations that will be apparent upon reading and understanding the present specification, at least some embodiments of the present invention describes a lighting-junction-box-assembly-for-remodel (hereinafter, "assembly"). In some embodiments, the assembly may comprise: a lighting-junction-box, leg-springs attached to the lighting-junction-box, and mounting-tabs attached to the lighting-junction-box. In some embodiments, the leg-springs may be used to (temporarily) hold (by friction) the assembly within a hole in an existing ceiling, wherein that hole may be sized to fit the assembly (or a portion thereof) within the hole. This hole may be referred to as a largest-hole and/or as a cutout-for-junction-box. In some embodiments, while the leg-springs are (temporarily) holding the assembly within the hole (i.e., the largest-hole and/or the cutout-for-junction-box) in the existing ceiling, other/different holes (e.g., extension-portion holes) within extension-portions of the mounting-tabs are used to secure the entire assembly to the existing ceiling, via mechanical fasteners passing through the extension-portion holes and into the existing ceiling. An existing ceiling may be retrofitted with this assembly to have a lighting-junction-box where desired/needed in that existing ceiling; and as such, this assembly is particularly useful in remodeling situations (applications); however, the assembly may also be used in new construction.

It is an objective of the present invention to provide a lighting-junction-box-assembly-for-remodel (assembly) that is configured for use in adding-in/installing such a lighting-junction-box-assembly-for-remodel into an existing ceiling.

It is another objective of the present invention to provide a lighting-junction-box-assembly-for-remodel (assembly) that is for use in remodeling applications (scenarios) where it may be desired to install a lighting junction box into an existing ceiling.

It is another objective of the present invention to provide a lighting-junction-box-assembly-for-remodel (assembly) that has a lighting-junction-box component and that has leg-springs attached to the lighting-junction-box component.

It is another objective of the present invention to provide a lighting-junction-box-assembly-for-remodel (assembly) that has a lighting-junction-box component and that has leg-springs attached to the lighting-junction-box component, wherein the leg-springs are configured to at least temporarily hold up the lighting-junction-box-assembly-for-remodel within a ceiling cutout.

It is another objective of the present invention to provide a lighting-junction-box-assembly-for-remodel (assembly) that has appropriate and/or desirable rating(s), such as, but not limited to, UL (Underwriters' Laboratories) ratings and/or IC (insulation contact) ratings.

It is another objective of the present invention to provide a lighting-junction-box-assembly-for-remodel (assembly) that has a lighting-junction-box component and that has mounting-tabs attached to the lighting-junction-box component.

It is another objective of the present invention to provide a lighting-junction-box-assembly-for-remodel (assembly) that has a lighting-junction-box component and that has mounting-tabs attached to the lighting-junction-box component, wherein the mounting-tabs are configured for permitting secure attachment of the entire lighting-junction-box-assembly-for-remodel to the existing ceiling.

It is another objective of the present invention to provide a lighting-junction-box-assembly-for-remodel (assembly) that has a lighting-junction-box component, that has leg-springs attached to the lighting-junction-box component, and that has mounting-tabs attached to the lighting-junction-box component.

It is another objective of the present invention to provide a lighting-junction-box-assembly-for-remodel (assembly) that has a lighting-junction-box component, that has leg-springs attached to the lighting-junction-box component, and that has mounting-tabs attached to the lighting-junction-box component; wherein the leg-springs are configured to at least temporarily hold up the lighting-junction-box-assembly-for-remodel within a ceiling cutout; and wherein the mounting-tabs are configured for permitting secure attachment of the entire lighting-junction-box-assembly-for-remodel to the existing ceiling.

It is another objective of the present invention to provide a template for providing assistance in forming appropriately sized and located cutouts and/or holes within the existing ceiling.

It is another objective of the present invention to provide a template for providing assistance in forming appropriately sized and located cutouts and/or holes within the existing ceiling, wherein the template may be (removably and/or temporarily) attached to a bottom surface of the existing ceiling.

It is another objective of the present invention to provide a kit that has both a lighting-junction-box-assembly-for-remodel (assembly) and a template providing assistance in forming appropriately sized and located cutouts and/or holes within the existing ceiling.

It is another objective of the present invention to provide a kit that has a lighting-junction-box-assembly-for-remodel (assembly), a template providing assistance in forming appropriately sized and located cutouts and/or holes within the existing ceiling, and drywall-anchors.

It is another objective of the present invention to provide a kit that has a lighting-junction-box-assembly-for-remodel (assembly), a template providing assistance in forming appropriately sized and located cutouts and/or holes within the existing ceiling, drywall-anchors, and mechanical fasteners (such as, but not limited to, screws) for use in securing the lighting-junction-box-assembly-for-remodel to the existing ceiling.

It is yet another objective of the present invention to provide a method of retrofitting an existing ceiling with a lighting-junction-box-assembly-for-remodel (assembly) installed within that existing ceiling.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
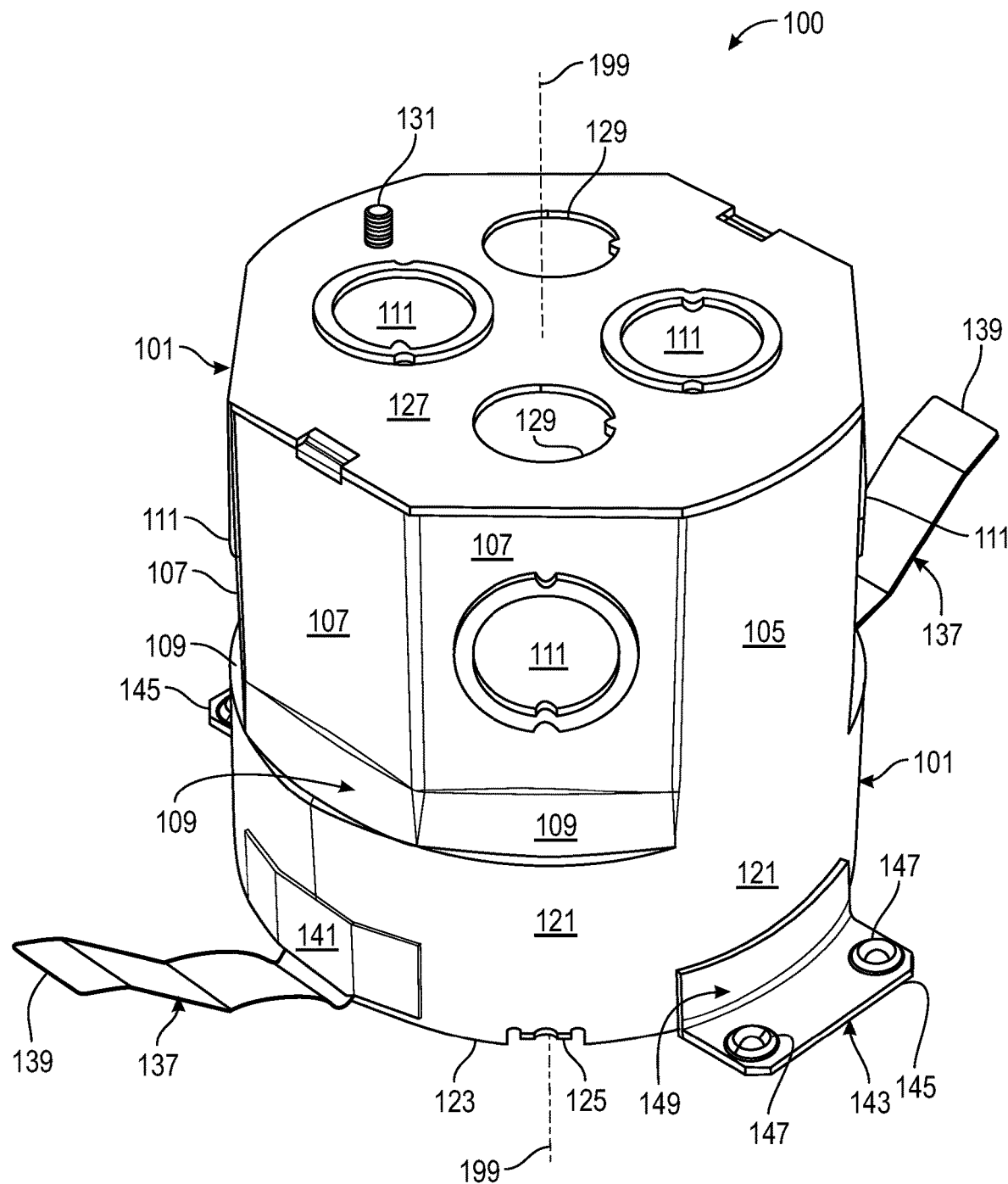
FIG. 1A depicts a top perspective view of a lighting-junction-box-assembly-for-remodel.

REFERENCE NUMERAL SCHEDULE 100 lighting-junction-box-assembly-for-remodel (assembly) 100
101 lighting-junction-box 101
103 upper-portion 103
105 curved-segment(s) 105
107 planar-face(s) 107
109 sloped-indentation(s) 109
111 knock-out(s) 111
113 internal-curved-portion 113
115 internal-planar-portion 115
117 internal-tab 117
119 hole 119

121 lower-portion 121
123 bottom-circular-edge 123
125 notch 125
127 lid 127
129 hole-for-conduit(s) 129
131 screw/bolt 131
133 internal-side 133
135 cavity 135
137 spring(s) 137
139 elongate-leg-portion 139
141 complimentary-mounting-portion 141
143 mounting-tab(s) 143
145 extension-portion 145
147 hole(s) (extension-portion hole(s)) 147
149 complimentary-mounting-portion 149
151 outside-transverse-width 151
153 outside-diameter 153
155 angle-between-connected-planar-faces 155
157 angle-between-planar-face-and-connected-curved-segment 157
199 axial-centerline 199
201 top 201
300 (existing) ceiling 300
301 cutout-for-junction-box (largest-hole) 301
303 hole-for-mounting-tab-and-anchor (smaller-hole(s)) 303
400 template 400
401 template-for-cutout-for-junction-box (single-largest-circle) 401
403 template-for-hole-for-mounting-plate-and-anchor (smaller-circles) 403
500 method of retrofitting existing ceiling with lighting junction box 500
501 step of attaching template to bottom surface of existing ceiling 501
503 step of cutting "cutout-for-junction-box" 503
505 step of drilling holes for drywall-anchors and/or for mechanical fasteners into ceiling 505
507 step of inserting drywall-anchors into drilled out holes in ceiling 507
509 step of squeezing elongate-leg-portions towards side-walls of lighting-junction-box 509
511 step of inserting lighting-junction-box into "cutout-for-junction-box" in ceiling 511
513 step of securing mechanical fasteners to extension-portion holes & into ceiling holes 513

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
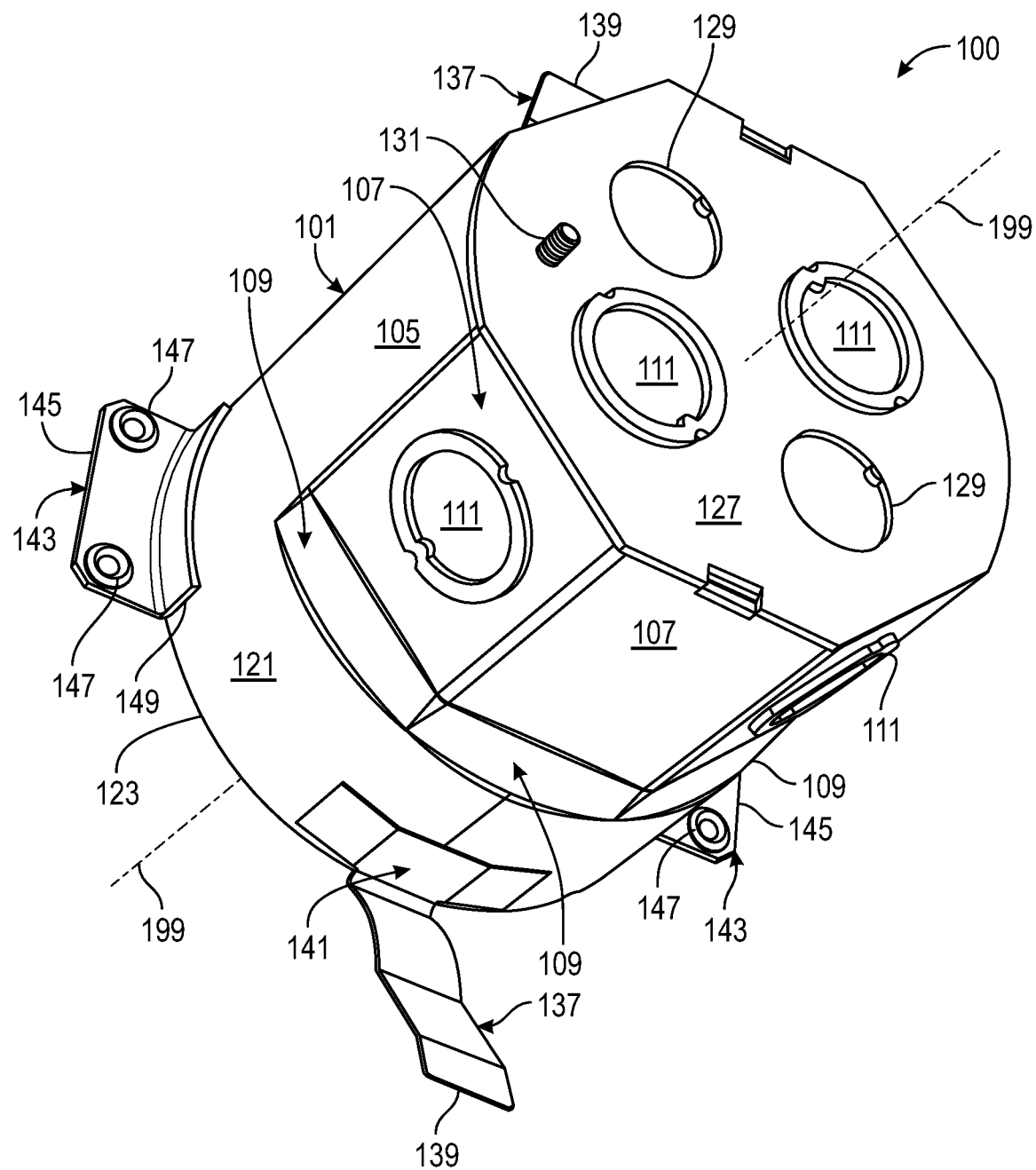
FIG. 1B depicts another top perspective view (i.e., a different view from FIG. 1A) of the lighting-junction-box-assembly-for-remodel of FIG. 1A.
Figure 1C:
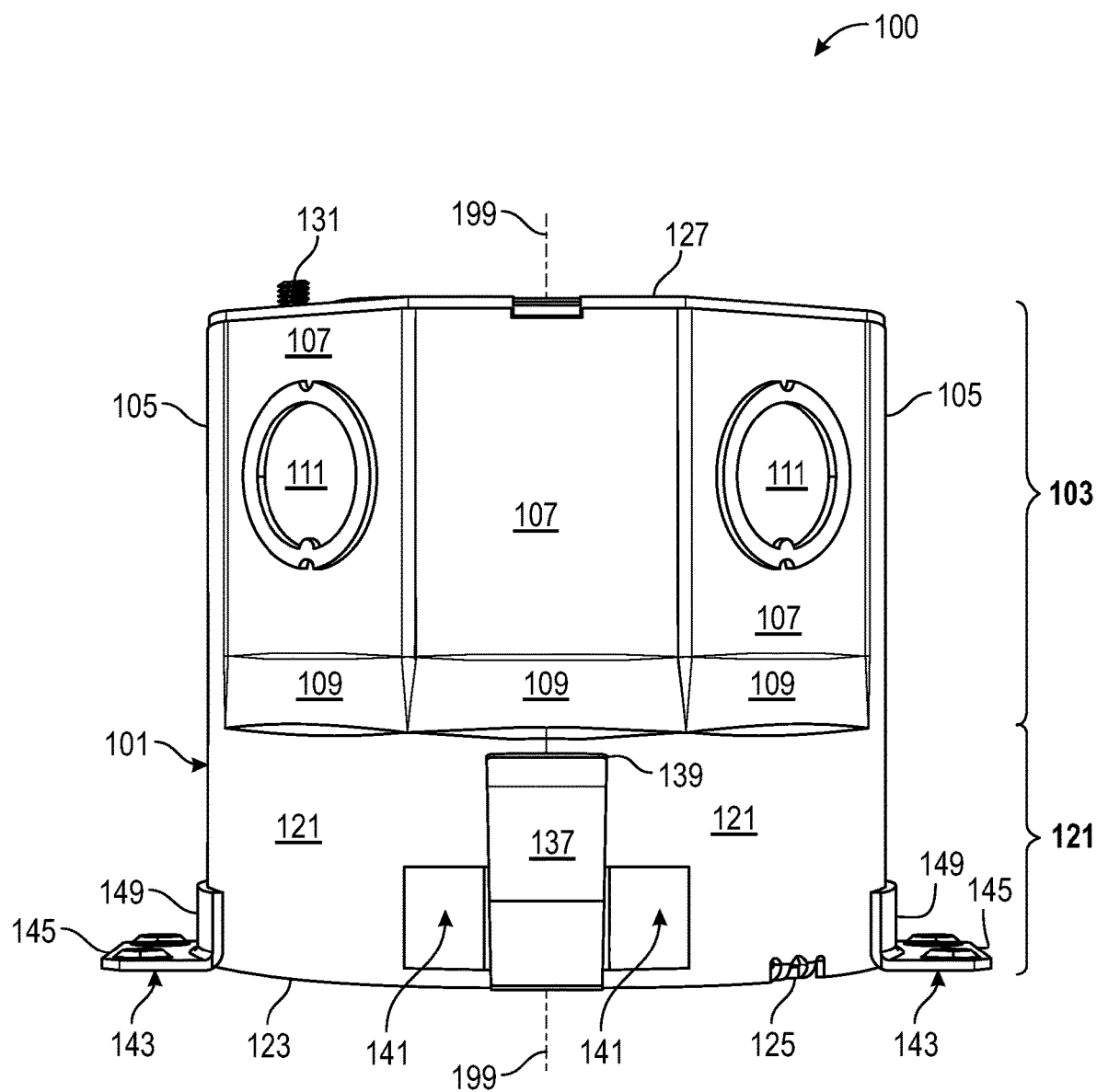
FIG. 1C depicts a front view of the lighting-junction-box-assembly-for-remodel of FIG. 1A.
Figure 1D:
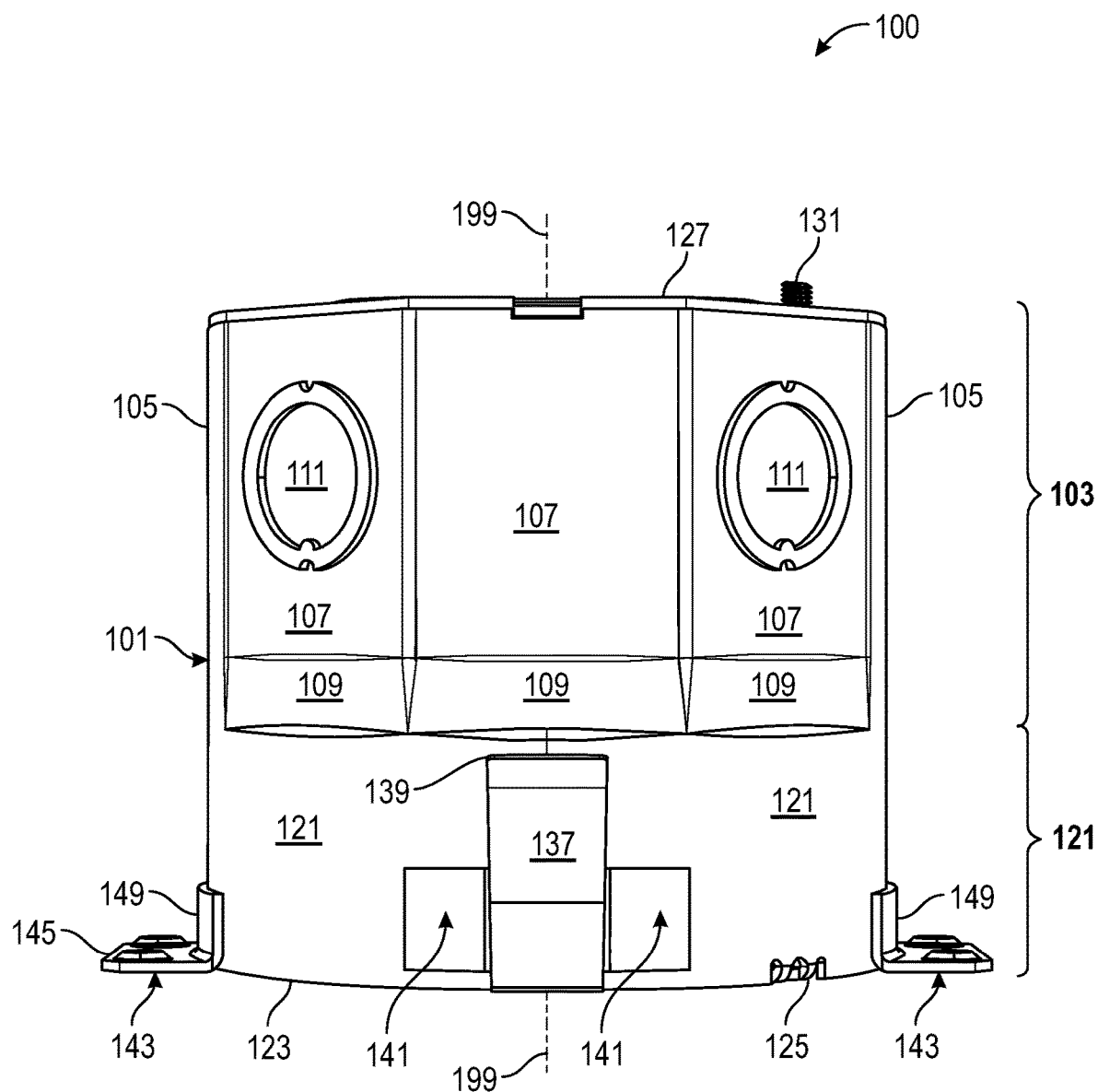
FIG. 1D depicts a rear (back) view of the lighting-junction-box-assembly-for-remodel of FIG. 1A.
Figure 1E:
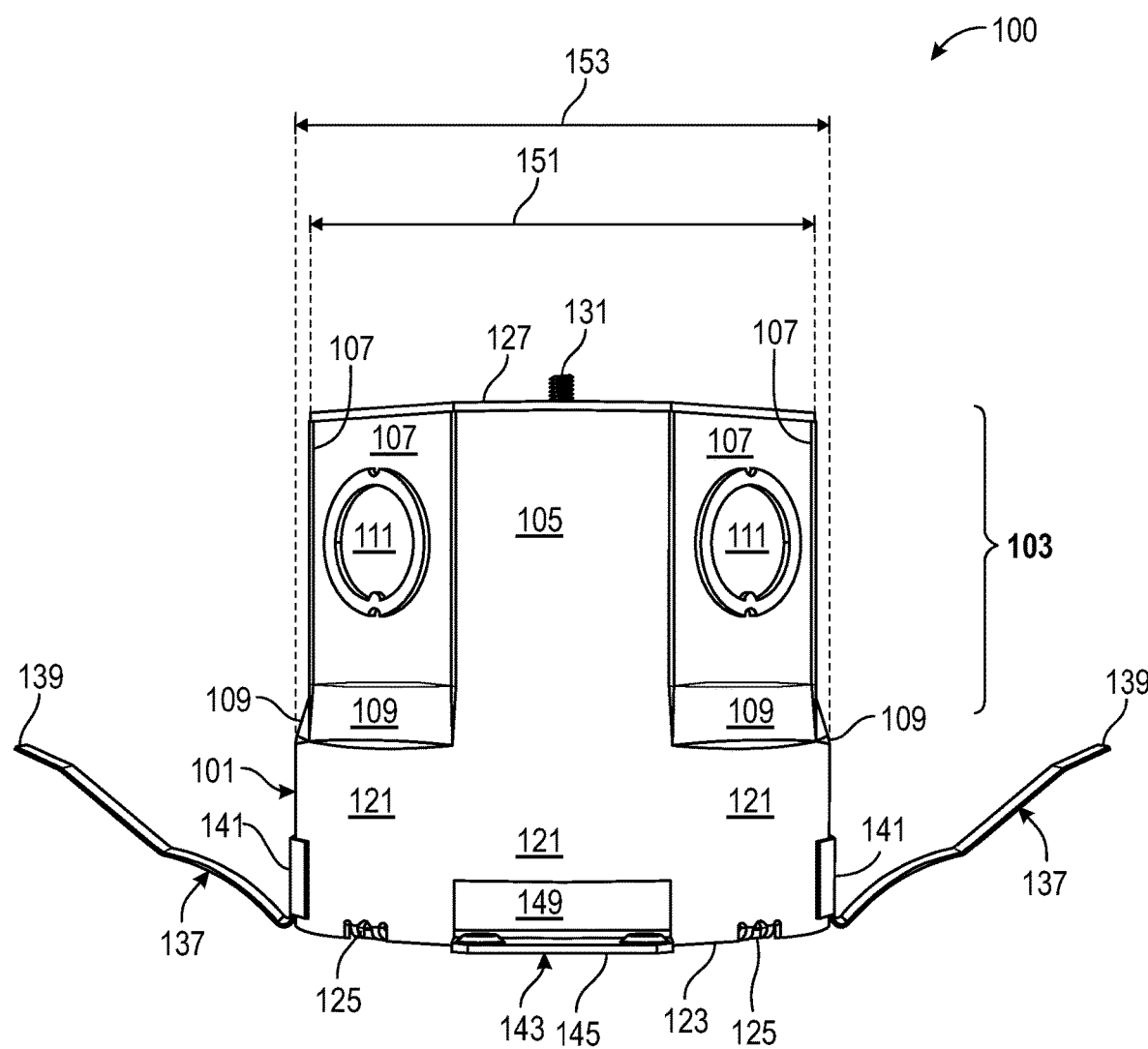
FIG. 1E depicts a left-side view of the lighting-junction-box-assembly-for-remodel of FIG. 1A.
Figure 1F:
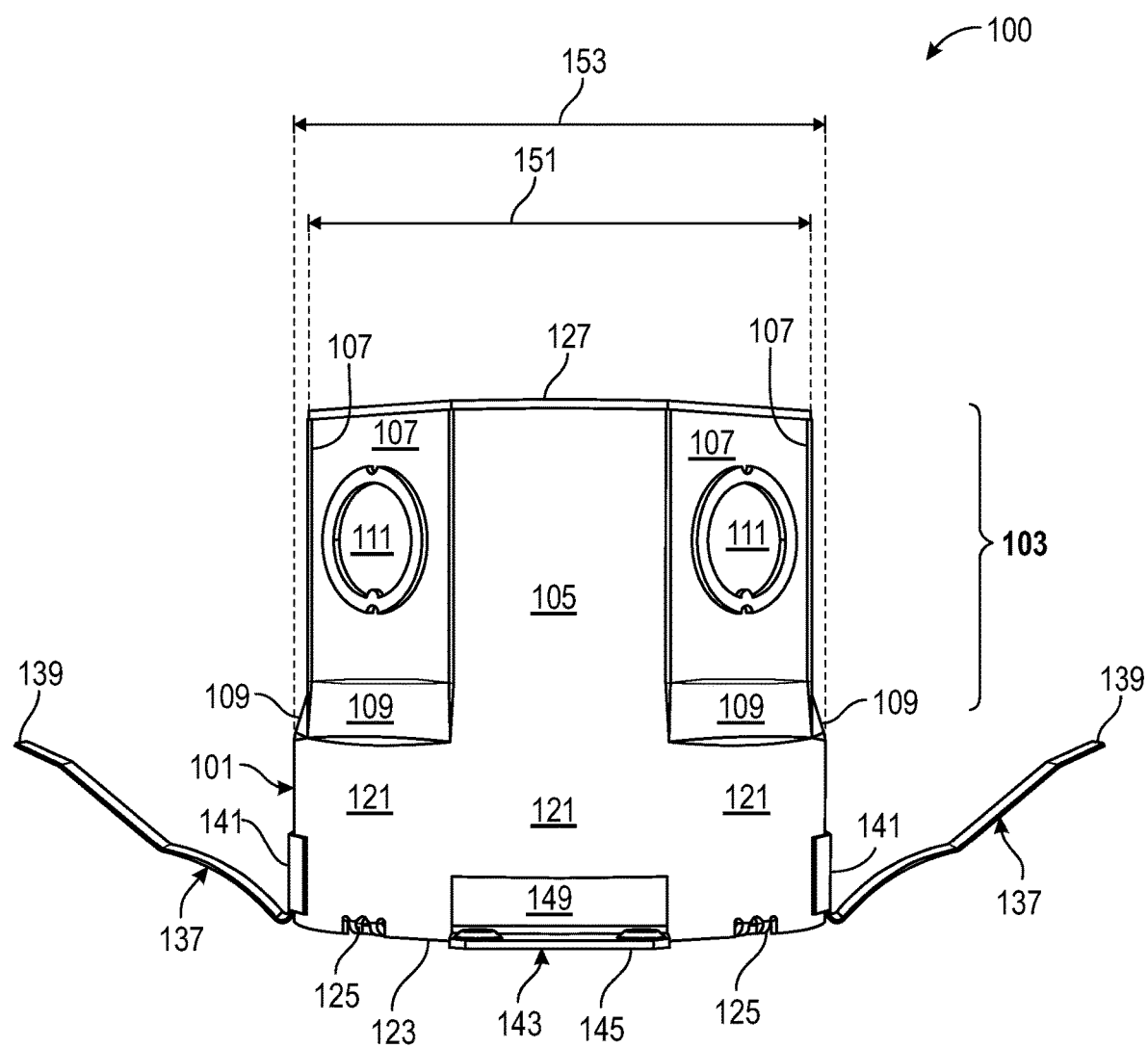
FIG. 1F depicts a right-side view of the lighting-junction-box-assembly-for-remodel of FIG. 1A.
Figure 1G:
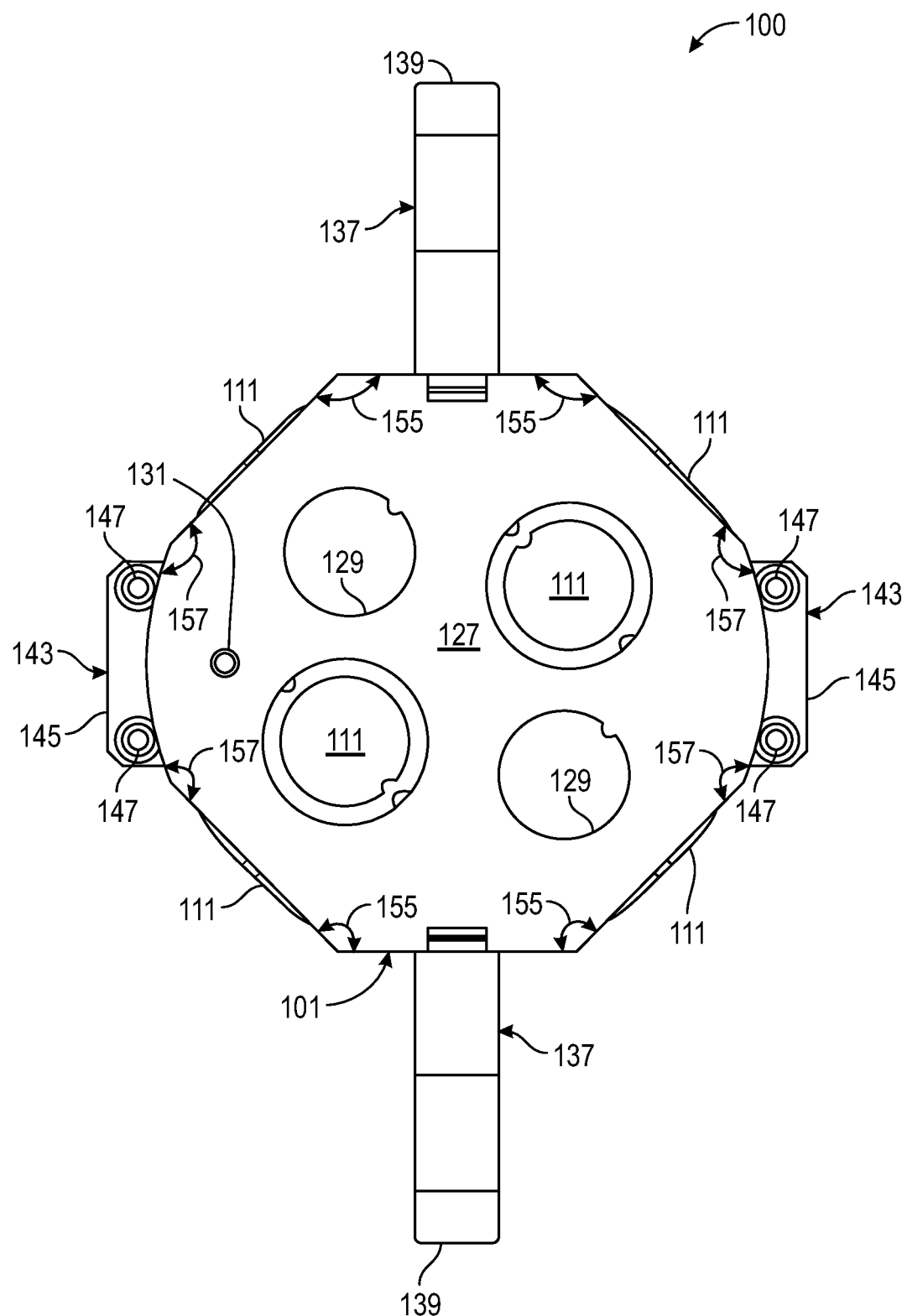
FIG. 1G depicts a top view of the lighting-junction-box-assembly-for-remodel of FIG. 1A.
Figure 1H:
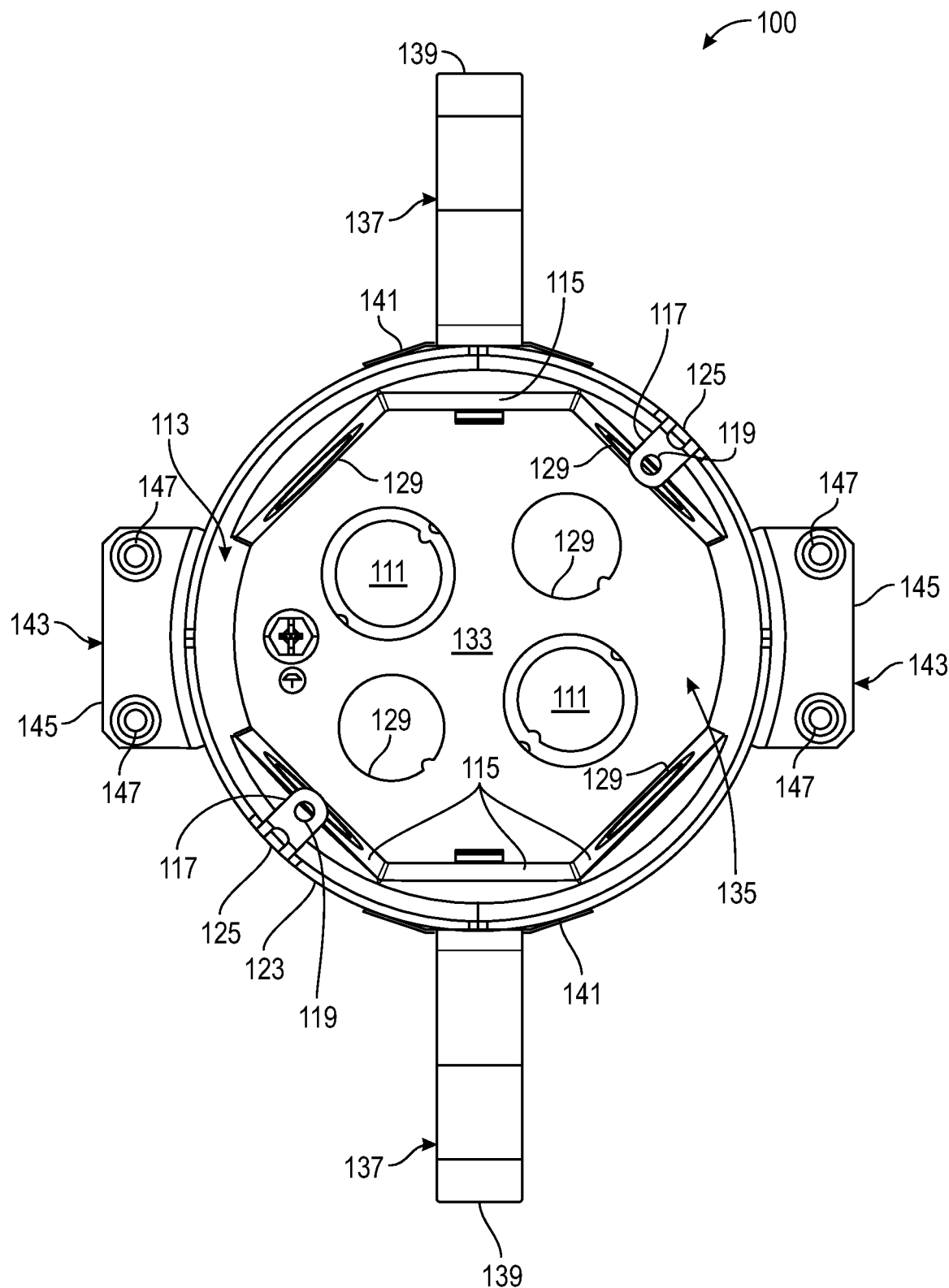
FIG. 1H depicts a bottom view of the lighting-junction-box-assembly-for-remodel of FIG. 1A.
Figure 1I:
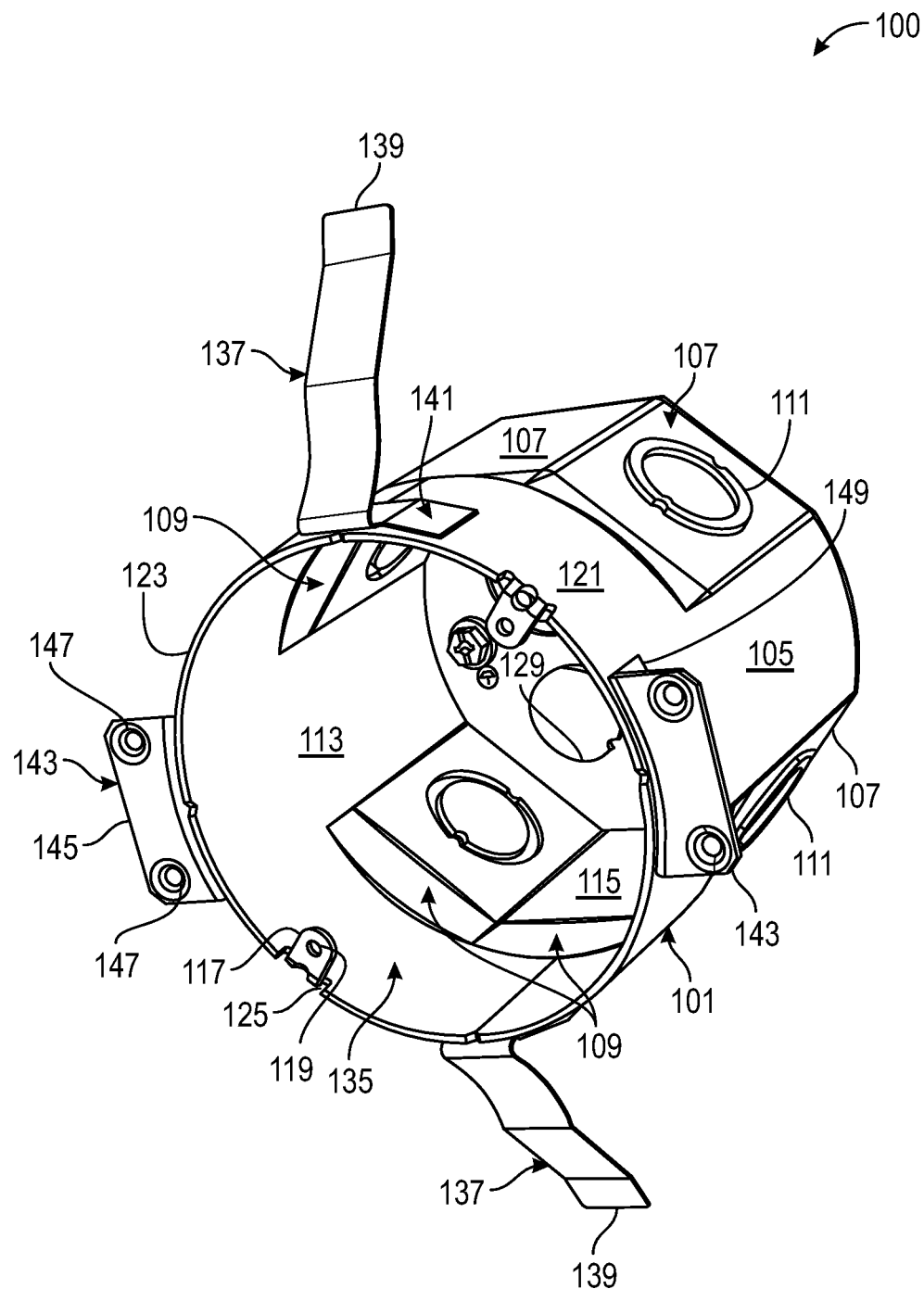
FIG. 1I depicts a bottom perspective view of the lighting-junction-box-assembly-for-remodel of FIG. 1A.
Figure 1J:
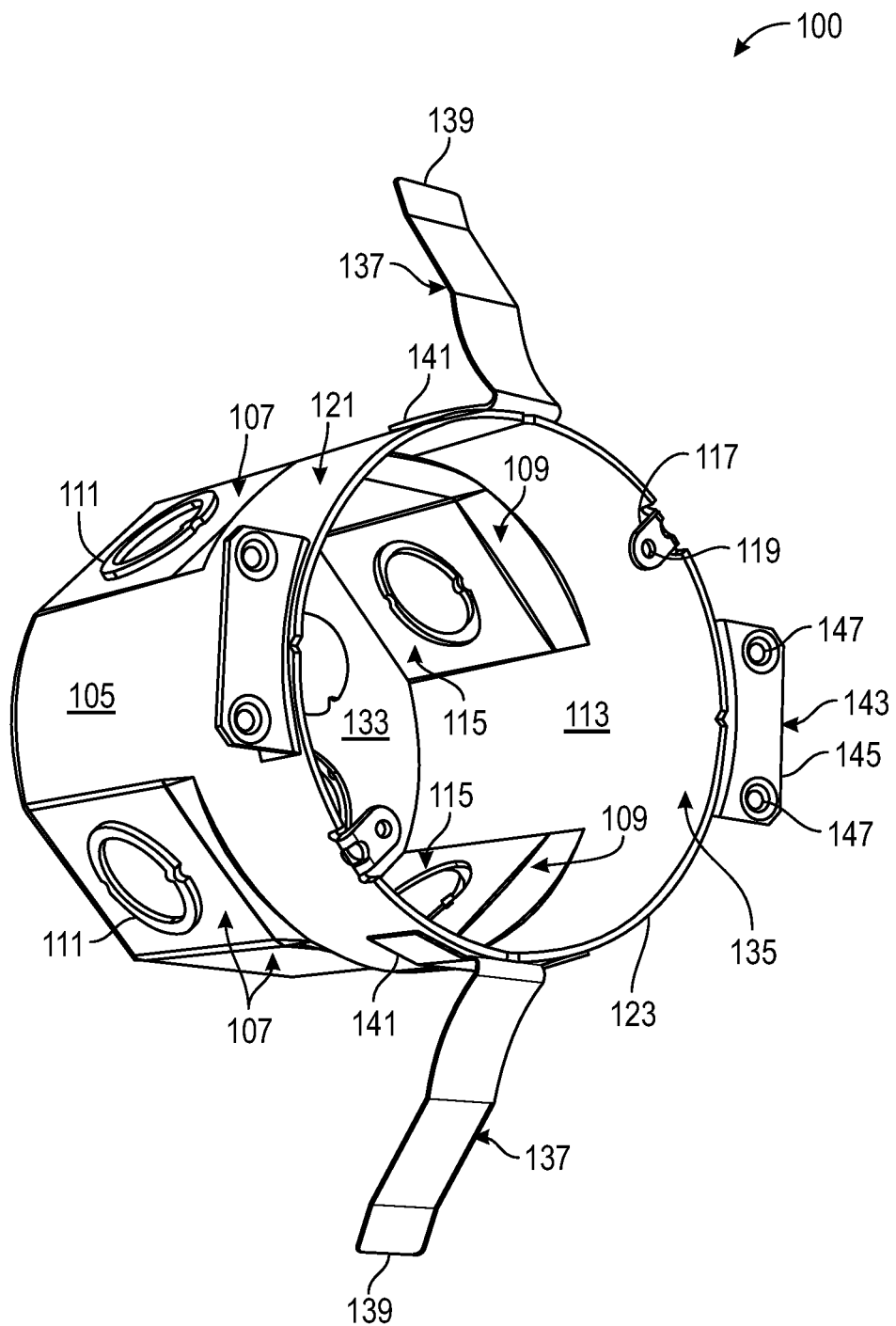
FIG. 1J depicts another bottom perspective view (i.e., a different view from FIG. 1I) of the lighting-junction-box-assembly-for-remodel of FIG. 1A.

FIG. 1A depicts a top perspective view of a lighting-junction-box-assembly-for-remodel 100 (hereinafter, "assembly 100"). FIG. 1B depicts another top perspective view (i.e., a different view from FIG. 1A) of assembly 100. FIG. 1C depicts a front view of assembly 100. FIG. 1D depicts a rear (back) view of assembly 100. FIG. 1E depicts a left-side view of assembly 100. FIG. 1F depicts a right-side view of assembly 100. FIG. 1G depicts a top view of assembly 100. FIG. 1H depicts a bottom view of assembly 100. FIG. 1I depicts a bottom perspective view of assembly 100. FIG. 1J depicts another bottom perspective view (i.e., a different view from FIG. 1I) of assembly 100.

In some embodiments, assembly 100 may be similar to "assembly 100" of U.S. patent application Ser. No. 17/106,048, filed Nov. 20, 2020, by the same inventor as the present patent application; except that the present assembly 100 may not include "adjusting-plates 600" nor guide-rail(s) 500" from U.S. patent application Ser. No. 17/106,048. In some embodiments, lighting-junction-box 101 may be substantially (mostly) similar to "junction-box 300" of U.S. patent application Ser. No. 17/106,048, filed Nov. 20, 2020, by the same inventor as the present patent application. Note, U.S. patent application Ser. No. 17/106,048, filed Nov. 20, 2020, is incorporated by reference as if fully set forth herein.

In some embodiments, assembly 100 may comprise at least one lighting-junction-box 101, at least one spring 137 attached to the at least one lighting-junction-box 101, and at least one mounting-tab 143 also attached to the at least one lighting-junction-box 101. In some embodiments, assembly 100 may comprise at least one lighting-junction-box 101, at least two springs 137 attached to the at least one lighting-junction-box 101, and at least two mounting-tabs 143 also attached to the at least one lighting-junction-box 101. See e.g., FIG. 1A to FIG. 1J.

In some embodiments, assembly 100 and/or lighting-junction-box 101 may have a fixed, finite, and predetermined total height (e.g., from bottom-circular-edge 123 to a top of lid 127). In some embodiments, assembly 100 and/or lighting-junction-box 101 may have a total height of four (4) inches (e.g., from bottom-circular-edge 123 to a top of lid 127). In some embodiments, assembly 100, lower-portion 121, and opposing curved-segments 105 may have a fixed, finite, and predetermined outside-diameter 153. In some embodiments, assembly 100, lower-portion 121, and opposing curved-segments 105 may have an outside-diameter 153 of four and one-eighth (4⅛) inches. In some embodiments, assembly 100, may have a maximum transverse-width from opposing distal ends of elongate-leg-portions 139 (when springs 137 are in their relaxed default configuration and not being squeezed) that is predetermined. In some embodiments, assembly 100, may have a maximum transverse-width from opposing distal ends of elongate-leg-portions 139 (when springs 137 are in their relaxed default configuration and not being squeezed) of seven and five-eights (7⅝) inches. Note, in other embodiments, assembly 100, lighting-junction-box 101, and/or portions thereof may have other predetermined dimensions. See e.g., FIG. 1C to FIG. 1F.

In some embodiments, lighting-junction-box-assembly 100 (assembly 100) may be configured for installation into a ceiling (e.g., an existing ceiling 300). In some embodiments, assembly 100 may comprise lighting-junction-box 101, at least two springs 137, and at least two mounting-tabs 143. In some embodiments, lighting-junction-box 101 may be configured for at least housing a portion of a lighting module within a cavity 135 of lighting-junction-box 101. In some embodiments, at least two springs 137 may be attached to lighting-junction-box 101. In some embodiments, each of at least two springs 137 may have a distal end that points away from side-walls of lighting-junction-box 101, but wherein the distal end does at least partially point upwards from a bottom 123 of lighting-junction-box 101 towards a top 201 of lighting-junction-box 101. In some embodiments, each of at least two springs 137 may be configured to frictionally engage interior sides of a hole (e.g., cutout 301) within ceiling 300, wherein that hole (e.g., cutout 301) may be sized to fit at least most of lighting-junction-box 101 within an inside diameter of that hole (e.g., cutout 301). In some embodiments, at least two mounting-tabs 143 may be attached to lighting-junction-box 101. In some embodiments, each of at least two mounting-tabs 143 may have an extension-portion 145 that points away from side-walls of lighting-junction-box 101. In some embodiments, each of at least two mounting-tabs 143 may be configured for facilitating attachment to ceiling 300. In some embodiments, the distal ends of at least two springs 137 and extension-portions 145 of at least two mounting-tabs 143 may all point in different directions from each other. See e.g., FIG. 1A to FIG. 3.

In some embodiments, lighting-junction-box 101 may comprise upper-portion 103, lower-portion 121, and lid 127. See e.g., FIG. 1C. When lid 127 may be attached to top 201 of upper-portion 103, upper-portion 103 and lower-portion 121 may form a hollow elongate structure (that is closed at top 201 and that is open at a bottom 123), with (side-wall) portions that are substantially (mostly) similar to a hollow right cylinder. See e.g., FIG. 1A through FIG. 1J. In some embodiments, lighting-junction-box 101 may be free from (without) any external annular to mostly annular flange(s). In some embodiments, this hollow interior space of lighting-junction-box 101 may be designated herein as cavity 135. In some embodiments, lighting-junction-box 101 may comprise cavity 135. In some embodiments, cavity 135 of lighting-junction-box 101 may be configured to receive one or more of: lighting modules, lighting elements, lights, LED(s) (light emitting diode(s)), lens, reflector(s), driver(s), controller(s), dimmer(s), electronics, circuits, portions thereof, combinations thereof, and/or the like. See e.g., FIG. 1H, FIG. 1I, and FIG. 1J for cavity 135. In some embodiments, cavity 135 may be (substantially [mostly]) bound of sides of cavity 135 by upper-portion 103 and lower-portion 121. In some embodiments, side-wall(s) of cavity 135 may be (substantially [mostly]) formed form upper-portion 103 and lower-portion 121. See e.g., FIG. 1I and FIG. 1J. In some embodiments, cavity 135 may be (substantially [mostly]) bound (closed) of on a top of cavity 135 by lid 127. See e.g., FIG. 1A. In some embodiments, cavity 135 may be (substantially [mostly]) open at bottom 123. See e.g., FIG. 1H, FIG. 1I, and FIG. 1J.

In some embodiments, lighting-junction-box 101 may comprise a lid 127 and sidewalls. In some embodiments, lid 127 and the side-walls may at least mostly circumscribe cavity 135 around all boundaries of cavity 135 except at bottom 123 of lighting-junction-box 101. In some embodiments, wherein lid 127 and the side-walls may be at least mostly solid closed structures (e.g., lid 127 and/or upper-portion 103 side-walls may have hole-for-conduit(s) 129 and some hole-for-conduit(s) 129 may or may not be covered with knock-out(s) 111). In some embodiments, bottom 123 of lighting-junction-box 101 may be at least mostly (substantially) open providing access to cavity 135. See e.g., FIG. 1A to FIG. 3.

Note, for reference purposes lighting-junction-box 101 may have an axial-centerline 199 that runs through a center of lighting-junction-box 101 from bottom-circular-edge 123 to top 201/lid 127 of lighting-junction-box 101. See e.g., FIG. 1A to FIG. 1D. For example, and without limiting the scope of the present invention, if assembly 100 was installed within a ceiling 300, and a bottom surface of that existing ceiling 300 was at least mostly (substantially) horizontal (e.g., at least mostly parallel with a below floor's surface), then axial-centerline 199 may be in at least a mostly (substantially) vertical configuration with respect to the at least mostly (substantially) horizontal bottom surface of that existing ceiling 300.

Note, upper-portion 103 may be first called out in FIG. 1C (and also called out in FIGS. 1D to 1F). FIG. 1A, FIG. 1B, FIG. 1I, and FIG. 1J also show at least portions of upper-portion 103 (but upper-portion 103 is not called out in FIG. 1A, FIG. 1B, FIG. 1I, and FIG. 1J). At least portions of lower-portion 121 may be shown (and called out) in FIG. 1A through FIG. 1F, and in FIG. 1H through FIG. 1J. In some embodiments, lighting-junction-box 101 may comprise an upper-portion 103 and an attached/integral lower-portion 121 (and lid 127 in some embodiments). In some embodiments, upper-portion 103 may be attached to lower-portion 121. In some embodiments, a bottom of upper-portion 103 may be attached to a top of lower-portion 121. In some embodiments, upper-portion 103 and lower-portion 121 may be integral with respect to each other. In some embodiments, upper-portion 103 and lower-portion 121 may be made from a single article of manufacture. In some embodiments, upper-portion 103 may transition into lower-portion 121. In some embodiments, upper-portion 103 may transition smoothly and/or seamlessly into lower-portion 121. In some embodiments, upper-portion 103 may transition substantially (mostly) smoothly and/or substantially (mostly) seamlessly into lower-portion 121. See e.g., FIG. 1A through FIG. 1F and see FIG. 1I and FIG. 1J. In some embodiments, a height of upper-portion 103 may be taller than a height of lower-portion 121. In some embodiments, a height of upper-portion 103 may be from 1.7 to 2.2 times taller than a height of lower-portion 121. See e.g., FIG. 1C through FIG. 1F.

In some embodiments, upper-portion 103 may comprise the upper side-walls of lighting-junction-box 101 and lower-portion 121 may comprise the lower side-walls of lighting-junction-box 101. In some embodiments, the upper side-walls of lighting-junction-box 101 may have two different types of side-walls, namely, curved-segment(s) 105 and planar-face(s) 107. In some embodiments, upper-portion 103 may comprise curved-segment(s) 105 and planar-face(s) 107. In some embodiments, curved-segment(s) 105 may be a section (or sections) of side-wall of upper-portion 103 that is curved (with a similar to or same curvature as that of lower-portion 121); whereas, planar-face(s) 107 may be a section (or sections) of side-wall of upper-portion 103 that is at least substantially (mostly) flat and/or planar (and not curved). In some embodiments, a main planar surface of planar-face 107, may run in a bottom to top direction (or top to bottom direction) and may be at least mostly (substantially) parallel with axial-centerline 199. See e.g., FIG. 1A.

In some embodiments, a radius of curvature of curved-segment(s) 105 may be the same (or at least mostly the same) as a radius of curvature of the side-wall(s) of lower-portion 121. In some embodiments, a transition from a given curved-segment 105 to a portion of lower-portion 121 that is directly below that given curved-segment 105 may be seamless and/or smooth. In some embodiments, a given curved-segment 105 and a portion of lower-portion 121 that is directly below that given curved-segment 105 may be integral with respect to each other and/or of a single article of manufacture. See e.g., FIG. 1A.

In some embodiments, a transition from a given planar-face 107 to a portion of lower-portion 121 that is directly below that given planar-face 107 may involve an intermediary structure, termed a sloped-indentation 109. In some embodiments, lighting-junction-box 101 and/or upper-portion 103 may comprise one or more sloped-indentation(s) 109. In some embodiments, between a bottom of each planar-face 107 and a top of the lower-portion 121 that is directly below that given planar-face 107, there may be at least one sloped-indentation 109 that physically/operatively links that given planar-face 107 to that particular section of lower-portion 121. In some embodiments, a given sloped-indentation 109, may be a transition structure, that transitions a bottom of a given planar-face 107 into a top of a section of lower-portion 121 that is directly below that given planar-face 107. See e.g., FIG. 1A. In some embodiments, a top of a given (first) sloped-indentation 109 may have a transverse-width (e.g., outside-transverse-width 151) to a top of an opposing (second) sloped-indentation 109 that is the same or mostly the same as a transverse-width (e.g., outside-transverse-width 151) between opposing planar-faces 107 that are located directly above those two sloped-indentations 109; whereas, a bottom of that given (first) sloped-indentation 109 may have an outside diameter (e.g., outside-diameter 153) to a bottom of an opposing (second) sloped-indentation 109 that is the same or mostly the same as an outside diameter (e.g., outside-diameter 153) between opposing sections of lower-portion 121 that are directly below those two sloped-indentations 109. See e.g., FIG. 1E and/or FIG. 1F.

In some embodiments, outside-transverse-width 151 may be an outside transverse-width between opposing planar-faces 107; and/or outside-transverse-width 151 may be an outside transverse-width between tops of opposing sloped-indentations 109. In some embodiments, outside-diameter 153 may be an outside diameter between opposing sections of lower-portion 121; and/or outside-diameter 153 may be an outside diameter between bottoms of opposing sloped-indentations 109. In some embodiments, outside-diameter 153 may be larger (longer) than outside-transverse-width 151. See e.g., FIG. 1E and/or FIG. 1F.

In some embodiments, a given slope-indentation 109 may begin at its top being substantially flat and/or planar and may smoothly transition into a curved portion at its bottom. See e.g., FIG. 1A and FIG. 1E.

In some embodiments, upper-portion 103 may have a quantity of six (6) planar-faces 107 and a quantity of two (2) curved-segments 105. In some embodiments, the six (6) planar-faces 107 may be arranged in two separate/distinct groups of three (3) planar-faces 107, with one of the two (2) curved-segments 105 being located in between each of the two groups of three (3) planar-faces 107. In some embodiments, the six (6) planar-faces 107 and the two (2) curved-segments 105 may be arranged in a closed ring structure of upper-portion 101 sidewalls when viewed from the top. In some embodiments, a first planar-face 107 may be attached to a second planar-face 107; the second planar-face 107 may be attached to a third planar-face 107 (forming a first group of connected planar-faces 107); the third planar-face 107 may be attached to a first curved-segment 105; the first curved-segment 105 may be attached to a fourth planar-face 107; the fourth planar-face 107 may be attached to a fifth planar-face 107; the fifth planar-face 107 may be attached to a sixth (and final) planar-face 107 (forming a second group of connected planar-faces 107); the sixth (and final) planar-face 107 may be attached to a second (and final) curved-segment 105; and the second (and final) curved-segment 105 may be attached to the first planar-face 107—forming a closed ring structure (of sidewalls) when viewed from above. In some embodiments, when viewed from above, the first group of connected planar-faces 107 and the second group of connected planar-faces 107 may each form half of a hexagon or hexagon like structure; wherein those two half hexagon or hexagon like structures are joined together by the two opposing curved-segments 105 (i.e., the first curved-segment 105 and the second curved-segment 105). In some embodiments, there may be a fixed and no-variable angle-between-connected-planar-faces 155 (angle 155). In some embodiments, angle 155 may be between first and second planar-faces 107, between second and third planar-faces 107 (i.e., the first group of connected planar-faces 107); between fourth and fifth planar-faces 107, and between fifth and sixth planar-faces 107 (i.e., the second group of connected planar-faces 107). In some embodiments, there may be a fixed and no-variable angle-between-planar-face-and-connected-curved-segment 157 (angle 157). In some embodiments, angle 157 may be between third planar-face 107 and first curved-segment 105, between first curved-segment 105 and fourth planar-face 107; between sixth planar-face 107 and second curved-segment 105; and between second curved-segment 105 and first planar-face 107. In some embodiments, there may be four (4) angles 155; and four (4) angles 157; such that the closed ring like structure of upper-portion 103 approximates a look of an octagon when viewed from the top, except that the two (2) opposing curved-segments 105 are curved and not flat/planar. In some embodiments, angle 157 may be larger than angle 155. See e.g., FIG. 1G, FIG. 1A, FIG. 1B, FIG. 1I, and FIG. 1J.

In some embodiments, all planar-surfaces 107 of a given upper-portion 103, may have a same: transverse-width, length/height, and/or thickness. See e.g., FIG. 1C to FIG. 1G. In some embodiments, all planar-surfaces 107 of a given upper-portion 103, may be more flat and planar than curved/rounded. In some embodiments, all planar-surfaces 107 of a given upper-portion 103, may be substantially (mostly) without a curved surface and/or a radiused surface. In some embodiments, all planar-surfaces 107 of a given upper-portion 103, may be shorter than an overall/total length/height of assembly 100/lighting-junction-box 101. See e.g., FIG. 1C to FIG. 1G.

In some embodiments, at least one of planar-face(s) 107 may comprise one or more of: knock-out(s) 111 and/or hole-for-conduit(s) 129. In some embodiments, four (4) of the six (6) planar-face 107 may comprise one or more of: knock-out(s) 111 and/or hole-for-conduit(s) 129. In some embodiments, hole-for-conduit 129 may be a through hole passing entirely through a section/portion of a given planar-face 107. In some embodiments, hole-for-conduit 129 may be configured to permit passage of a portion of conduit, cable, wire, portions thereof, combinations thereof, and/or the like. In some embodiments, a given hole-for-conduit 129 may be partially to totally covered (initially) by a knock-out 111. In some embodiments, a given knock-out 111 may be initially/temporarily cover over at least a portion of a given hole-for-conduit 129, until that given knock-out 111 may be removed (i.e., knocked-out). In some embodiments, a given knock-out 111 may be a disc (disk) like member. In some embodiments, a given hole-for-conduit 129 may be uncovered by a knock-out 111. See e.g., FIG. 1A through FIG. 1F and/or see FIG. 1I and FIG. 1J. In some embodiments, knock-out(s) 111 and/or hole-for-conduit(s) 129 may also be present in lid 127. See e.g., FIG. 1G and/or FIG. 1J.

In some embodiments, curved-segment(s) 105 may be free from (without) knockout(s) 111 and/or hole-for-conduit(s) 129. See e.g., FIG. 1A through FIG. 1F and/or see FIG. 1I and FIG. 1J.

In some embodiments, at least one of curved-segment 105 may comprise one or more of: knock-out(s) 111 and/or hole-for-conduit(s) 129.

In some embodiments, upper-portion 103 may be free from spring(s) 137, mounting-tab(s) 143, portions thereof, combinations thereof, and/or the like. See e.g., FIG. 1A through FIG. 1F and see FIG. 1I and FIG. 1J.

In some embodiments, lower-portion 121 may be a substantially (mostly) hollow right cylinder member, that begins at a bottom of bottom-circular-edge 123 and ends at a top of lower-portion 121 at where sloped-indentations 109 begins or at where curved-segments 105 begin. In some embodiments, lower-portion 121 may comprise and/or include one or more of: bottom-circular-edge 123, notch(es) 125, internal-tab(s) 117, hole(s) 119, at least some portions of internal-curved-portion 113, portions thereof, combinations thereof, and/or the like. In some embodiments, lower-portion 121 may have a same, uniform, fixed, finite, and/or predetermined outside-diameter 153, all along an outside perimeter of lower-portion 121. In some embodiments, lower-portion 121 may be free from (without) any external annular to mostly annular flange(s). See e.g., FIG. 1A through FIG. 1F; and see FIG. 1H to FIG. 1J for internal-tab(s) 117, hole(s) 119, and internal-curved-portion 113.

In some embodiments, bottom-circular-edge 123 may be a bottom edge of lower-portion 121 that may be substantially (mostly) circular when viewed from below (see e.g., FIG. 1H). In some embodiments, bottom-circular-edge 123 may comprise one or more notch(es) 125. In some embodiments, one or more notch(es) 125 may be located in bottom-circular-edge 123. In some embodiments, a pair of notches 125 may be opposing each other (see e.g., FIG. 1H).

In some embodiments, lower-portion 121 may be free from (without) one or more of: external annular to mostly annular flange(s), knock-out(s) 111, hole(s)-for-conduit 129, planar-face(s) 107, sloped-indentation(s) 109, lid 127, portions thereof, combinations thereof, and/or the like. In some embodiments, bottom-circular-edge 123 may be free from (without) one or more of: external annular to mostly annular flange(s), knock-out(s) 111, hole(s)-for-conduit 129, planar-face(s) 107, sloped-indentation(s) 109, lid 127, portions thereof, combinations thereof, and/or the like. See e.g., FIG. 1A through FIG. 1F and see FIG. 1I and FIG. 1J.

In some embodiments, assembly 100 and/or lighting-junction-box 101 may comprise at least one lid 127. In some embodiments, lid 127 may be attached to a top of upper-portion 103. In some embodiments, lid 127 may at least mostly (substantially) cover over an otherwise large upper/top hole to upper-portion 103. See e.g., FIG. 1A through FIG. 1F and FIG. 1I and FIG. 1J. In some embodiments, lid 127 may be attached to a top 201 of upper-portion 103. Note, top 201 of upper-portion 103 may be shown in the exploded views of FIG. 2A and/or FIG. 2B. In some embodiments, when lid 127 may be viewed from the top, lid 127 may have a shape that approximates an octagon, with an exception that two opposing sides (e.g., the opposing curved-segments 105) of the octagon are curved and not straight. See e.g., FIG. 1G. In some embodiments, lid 127 may comprise at least one screw/bolt 131. In some embodiments, screw/bolt 131 may be configured to being operatively connected in a ground/grounding circuit; e.g., when lid 127 and/or other portions of lighting-junction-box 101 may be at least substantially (mostly) from electrically conductive material(s) (e.g., metals). See e.g., FIG. 1A through FIG. 1E and see FIG. 1G through FIG. H.

In some embodiments, lid 127 may comprise at least one hole-for-conduit 129.

In some embodiments, hole-for-conduit 129 may be a through hole passing entirely through a section/portion of lid 127. In some embodiments, lid 127 may comprise at least one knock-out 111. See e.g., FIG. 1A.

In some embodiments, FIG. 1H through FIG. 1J may show various internal structures of lighting-junction-box 101. For example, and without limiting the scope of the present invention, at least some of cavity 135 may be shown in FIG. 1H through FIG. 1J. At least some of internal-curved-portion(s) 113 may also be shown in FIG. 1H through FIG. 1J. In some embodiments, internal-curved-portion 113 may be internal/interior sides/surfaces of curved-segment(s) 105 and/or of lower-portion 121. In some embodiments, internal-curved-portion(s) 113 may be part of both upper-portion 103 and lower-portion 121. At least some of internal-planar-portion(s) 115 may also be shown in FIG. 1H through FIG. 1J. In some embodiments, internal-planar-portion 115 may be internal/interior sides/surfaces of planar-face(s) 107. In some embodiments, internal-planar-portion(s) 115 may be only part of upper-portion 103 and not lower-portion 121. At least some portions of holes-for-conduit 129 in planar-face(s) 107/internal-planar-portion(s) 115 may be shown in FIG. 1H through FIG. 1J, wherein at least some of these holes-for-conduit 129 may be exteriorly covered by knock-outs 111 (see e.g., FIG. 1A). At least some of internal-side 133 may also be shown in FIG. 1H through FIG. 1J. In some embodiments, internal-side 133 may be internal/interior sides/surfaces of lid 127.

FIG. 1H through FIG. 1J may also show internal-tab(s) 117. In some embodiments, lighting-junction-box 101 and/or lower-portion 121 may comprise at least one internal-tab(s) 117. In some embodiments, lighting-junction-box 101 and/or lower-portion 121 may comprise at least two opposing internal-tab 117. In some embodiments, internal-tab 117 may be an interior facing (cavity 135 facing) tab/extension, that extends partially into cavity 135 by a fixed, finite, and predetermined length. In some embodiments, internal-tab 117 may begin at bottom-circular-edge 123 and terminate/end at an opposing distal end within cavity 135 and/or pointing into cavity 135. In some embodiments, internal-tab 117 may begin at notch 125 and terminate/end at an opposing distal end within cavity 135 and/or pointing into cavity 135. In some embodiments, that opposing distal end may comprise a hole 119. In some embodiments, hole 119 may pass entirely through the opposing distal end of a given internal-tab 117. In some embodiments, internal-tab(s) 117 may not be readily visible from front, rear, or side (left and/or right) views of lighting-junction-box 101 (assembly 100). In some embodiments, internal-tab(s) 117 may be configured to provide mounting, anchoring, and/or attachment structure for other articles to be attached to lower-portion 121 (and/or attached to lighting-junction-box 101). See e.g., FIG. 1H through FIG. 1J.

In some embodiments, assembly 100 may comprise at least one spring 137. In some embodiments, assembly 100 may comprise at least two springs 137. See e.g., FIG. 1A through FIG. 1J. In some embodiments, spring 137 may be a spring clip leg. In some embodiments, spring(s) 137 may be configured to provide friction/tension against an inside diameter of a given hole within a ceiling (e.g., a cutout-for-junction-box 301), wherein that ceiling hole may be intended to fit a largest outside diameter (e.g., outside-diameter 153) of assembly 100. See e.g., FIG. 3 for cutout-for-junction-box 301. In some embodiments, spring(s) 137 may prevent assembly 100 from falling down (by frictional resistance to sliding against a hole within the ceiling) while that assembly 100 may be (permanently) installed into a given ceiling.

In some embodiments, spring 137 may comprise elongate-leg-portion 139 and complimentary-mounting-portion 141. In some embodiments, elongate-leg-portion 139 may be elongate planar member that is longer than wide and wider than thick. In some embodiments, elongate-leg-portion 139 may have a finite, fixed, and predetermined length. In some embodiments, elongate-leg-portion 139 may have a finite, fixed, and predetermined rigidity, that may be appropriate for holding assembly 100 within cutout-for-junction-box 301; however, an installer may be able to squeeze (by hand) distal portions of elongate-leg-portion(s) 139 towards lighting-junction-box 101 sufficiently close, for at least a majority of lighting-junction-box 101/assembly 100 to be fit into cutout-for-junction-box 301. See e.g., FIG. 1A through FIG. 1J. In some embodiments, elongate-leg-portion 139 may be bendable and/or squeezable. In some embodiments, when elongate-leg-portion 139 may be bent and/or squeezed towards lighting-junction-box 101, that elongate-leg-portion 139 may want to return to its original configuration where elongate-leg-portion 139 was more extended out and away from lighting-junction-box 101; e.g., as shown in FIG. 1A through FIG. 1J.

In some embodiments, complimentary-mounting-portion 141 may be a portion of spring 137 that is attached to an exterior portion of lower-portion 121. In some embodiments, elongate-leg-portion 139 may be attached to complimentary-mounting-portion 141. In some embodiments, elongate-leg-portion 139 may extend out and away from complimentary-mounting-portion 141 and out and away from an exterior of lighting-junction-box 101. However, elongate-leg-portion 139 may be removably squeezed towards lighting-junction-box 101 and/or towards complimentary-mounting-portion 141, by hand(s) of an installer of assembly 100 into a given ceiling. In some embodiments, complimentary-mounting-portion 141 may have a radius of curvature that may be complimentary (matches) a radius of curvature of lower-portion 121. In some embodiments, complimentary-mounting-portion 141 may be attached to (an exterior of) lower-portion 121 at or proximate to bottom-circular-edge 123, wherein proximate in this context may be two (2) inches or less. In some embodiments, complimentary-mounting-portion 141 may be attached to an exterior of lower-portion 121, such that when elongate-leg-portion 139 is squeezed towards lighting-junction-box 101, no knock-out(s) 111 and/or no hole(s)-for-conduit 129 are blocked by the squeezed in elongate-leg-portion 139. In some embodiments, complimentary-mounting-portion 141 may be attached to an exterior of lower-portion 121, below a given planar-face 107 that is free of (without) any knock-out(s) 111 and/or free of (without) any hole(s)-for-conduit 129. In some embodiments, complimentary-mounting-portion 141 may be attached to an exterior of lower-portion 121, below a curved-segment 105 that is free of (without) any knock-out(s) 111 and/or free of (without) any hole(s)-for-conduit 129. In some embodiments, when there are two (2) springs 137 attached to (exteriors of) lower-portion 121, those two (2) springs 137 may be opposing each other by 180 degrees. See e.g., FIG. 1A through FIG. 1J.

In some embodiments, complimentary-mounting-portion 141 may be attached to an exterior of lower-portion 121 (at or near bottom-circular-edge 123, wherein "near" may within two (2) inches) by one or more of: a heat weld, adhesive, glue, solvent bond, an ultrasonic weld, a mechanical fastener, portions thereof, combinations thereof, and/or the like.

In some embodiments, spring 137 (e.g., complimentary-mounting-portion 141) may begin at or near bottom-circular-edge 123 of lower-portion 121, at an exterior of lower-portion 121, and then elongate-leg-portion 139 may extend both upwards towards top 201/lid 127 but also way from exterior sides of lighting-junction-box 101, such that an overall length of elongate-leg-portion 139 is not parallel with an axial-centerline 199 of lighting-junction-box 101 and that overall length of elongate-leg-portion 139 is also not orthogonal with the axial-centerline 199 of lighting-junction-box 101—when spring 137/elongate-leg-portion 139 is in a default/relaxed configuration (i.e., when spring 137/elongate-leg-portion 139 is not being bent/squeezed). In some embodiments, spring 137/elongate-leg-portion 139 may extend away from the opening to cavity 135 along bottom-circular-edge 123.

In some embodiments, spring 137/elongate-leg-portion 139 may not extend from a top to a bottom direction (e.g., a general direction from top 201/lid 127 towards bottom-circular-edge 123) of lighting-junction-box 101. In some embodiments, spring 137/elongate-leg-portion 139 may not extend in a direction from the (at least mostly) closed lid 127/top 201 towards the opening to cavity 135 along bottom-circular-edge 123.

In some embodiments, each of at least two springs 137 may comprise elongate-leg-portion 139 that may be longer than wide and wider than thick. In some embodiments, elongate-leg-portion 139 terminates at the distal-end of the given spring 137 disposed away from lower-portion 121. In some embodiments, elongate-leg-portion 139 may have an overall length that is not parallel nor orthogonal with an axial-centerline 199 of lighting-junction-box 101, when the elongate-leg-portion 139 is in a default resting relaxed configuration (i.e., the un-squeezed configuration). In some embodiments, elongate-leg-portion 139 may have a predetermined rigidity (stiffness) that is configured to be temporarily squeezed into a squeezed configuration towards the side-walls of lighting-junction-box 101 (during ceiling 300 installation operations) and when not being squeezed, elongate-leg-portion 139 may be in the default resting relaxed configuration. In some embodiments, when both of elongate-leg-portions 139 are in the squeezed configuration, lighting-junction-box-assembly 100 may be configured to fit at least mostly within a hole (cutout 301) in ceiling 300. In some embodiments, upper/top and/or lower/bottom surfaces of elongate-leg-portion 139 are neither parallel nor orthogonal from a major/main plane of lid 127, when elongate-leg-portion 139 may be in the default resting relaxed configuration. In some embodiments, each of the at least two springs 137 may comprise complimentary-mounting-portion 141 that may be attached to lower-portion 121 of lighting-junction-box 101. In some embodiments, the two complimentary-mounting-portions 141 may be oppositely disposed from each other (by 180 degrees) on lower-portion 121 of lighting-junction-box 101. See e.g., FIG. 1A to FIG. 3.

In some embodiments, assembly 100 may comprise at least one mounting-tab 143. In some embodiments, assembly 100 may comprise at least two (2) mounting-tabs 143. In some embodiments, mounting-tab 143 may be how assembly 100 is (permanently) attached to a given ceiling. In some embodiments, mounting-tab(s) 143 may be configured to provide structure for mounting assembly 100 to a given ceiling. See e.g., FIG. 1A through FIG. 1J.

In some embodiments, mounting-tab 143 may comprise extension-portion 145 and complimentary-mounting-portion 149. In some embodiments, extension-portion 145 may be elongate planar member that is wider than long and longer than thick. In some embodiments, extension-portion 145 may be shorter than elongate-leg-portion 139 (of a spring 137). In some embodiments, extension-portion 145 may be wider than elongate-leg-portion 139 (of a spring 137). In some embodiments, extension-portion 145 may have a finite, fixed, and predetermined length, width, and thickness. In some embodiments, extension-portion 145 may be a tab and/or an ear of rigid material that extends at least mostly (substantially) orthogonally away from lower-portion 121 and/or away from axial-centerline 199. In some embodiments, extension-portion 145 may comprise at least one hole 147. In some embodiments, extension-portion 145 may comprise at least two holes 147. In some embodiments, hole 147 may be a hole that passes entirely through a portion of extension-portion 145. In some embodiments, hole 147 may be configured to receive a mechanical fastener, such as, but not limited to, a screw, a bolt, a nail, a rivet, a staple, a brad, portions thereof, combinations thereof, and/or the like. See e.g., FIG. 1A through FIG. 1J.

In some embodiments, complimentary-mounting-portion 149 may be a portion of mounting-tab 143 that is attached to an exterior portion of lower-portion 121. In some embodiments, extension-portion 145 may be attached to complimentary-mounting-portion 141. In some embodiments, extension-portion 145 may extend out and away from complimentary-mounting-portion 149 and out and away from an exterior of lighting-junction-box 101. In some embodiments, complimentary-mounting-portion 149 may have a radius of curvature that may be complimentary (matches) a radius of curvature of lower-portion 121. In some embodiments, complimentary-mounting-portion 149 may be attached to (an exterior of) lower-portion 121 at or proximate to bottom-circular-edge 123, wherein proximate in this context may be two (2) inches or less. In some embodiments, complimentary-mounting-portion 149 may be attached to an exterior of lower-portion 121, such that when hole(s) 147 receive mechanical fastener(s), those mechanical fastener(s) and/or drywall-anchors that also may be receiving those mechanical fastener(s) do not block (obstruct) knock-out(s) 111 and/or hole(s) for-conduit 129 of the upper-portion 103. In some embodiments, complimentary-mounting-portion 149 may be attached to an exterior of lower-portion 121, below a curved-segment 105 that is free of (without) any knock-out(s) 111 and/or free of (without) any hole(s)-for-conduit 129. In some embodiments, complimentary-mounting-portion 149 may be attached to an exterior of lower-portion 121, below a given planar-face 107 that is free of (without) any knockout(s) 111 and/or free of (without) any hole(s)-for-conduit 129. In some embodiments, when there are two (2) mounting-tabs 143 attached to (exteriors of) lower-portion 121, those two (2) springs 137 may be opposing each other by 180 degrees. In some embodiments, a given mounting-tab 143 may be separated from a given closet spring 137 of lower-portion 121 by 90 degrees. See e.g., FIG. 1A through FIG. 1J.

In some embodiments, complimentary-mounting-portion 149 may be attached to an exterior of lower-portion 121 (at or near bottom-circular-edge 123, wherein "near" may within two (2) inches) by one or more of: a heat weld, adhesive, glue, solvent bond, an ultrasonic weld, a mechanical fastener, portions thereof, combinations thereof, and/or the like.

In some embodiments, bottom surfaces of extension-portion 145 may be at least mostly (substantially) flush with bottom surfaces of bottom-circular-edge 123. See e.g., FIG. 1C and/or FIG. 1D.

In some embodiments, extension-portion 145 may extends orthogonally away from axial-centerline 199 of lighting-junction-box 101. In some embodiments, upper/top and/or lower/bottom surfaces of extension-portion 145 may be substantially parallel with a major/main plane of lid 127. In some embodiments, each of at least two mounting-tabs 143 may comprise complimentary-mounting-portion 149 that may be attached to lower-portion 121 of lighting-junction-box 101. In some embodiments, the two complimentary-mounting-portions 149 may be oppositely disposed from each other (by 180 degrees) on lower-portion 121 of lighting-junction-box 101. In some embodiments, extension-portion 145 may comprise at least one through-hole 147. In some embodiments, at least one through-hole 147 may be configured to receive a mechanical fastener (such as, but not limited to, a screw) for attachment to ceiling 300. For example, and without limiting the scope of the present invention, a portion of the mechanical fastener (e.g., a portion near a head of the mechanical fastener) may pass through hole 147 and a different portion of the mechanical fastener (e.g., a distal portion disposed away from the head of the mechanical fastener) may be received into hole 303 (wherein hole 303 may or may not have drywall-anchor(s) installed therein). See e.g., FIG. 1A to FIG. 3 for various aspects of mounting-tab 143.

In some embodiments, if imaginary four (4) lines were to connect the four (4) holes 147, a rectangle shape, as viewed from a bottom of assembly 100, with rounded corners may be formed. See e.g., FIG. 1H. In some embodiments, that rectangle shape, may share a center with axial-centerline 199. In some embodiments, a length of that rectangle shape may be at least substantially (mostly) orthogonal/perpendicular to an imaginary line running between the two opposing springs 137. See e.g., FIG. 1H.

In some embodiments, each of the at least two springs 137 may comprise elongate-leg-portion 139, and elongate-leg-portion 139 may be longer than a length (or a width) of extension-portion 145. In some embodiments, a length of elongate-leg-portion 139 may be from four (4) to six (6) times longer than a length of extension-portion 145. See e.g., FIG. 1C to FIG. 1H.

In some embodiments, spring(s) 137 and/or mounting-tab(s) 143 are attached to/at, associated with, and/or in proximity to bottom-circular-edge 123 of lower-portion 121, wherein "associated with" and/or "in proximity to" in this context means a portion of spring(s) 137 (e.g., complimentary-mounting-portion 141) and/or of mounting-tab(s) 143 (e.g., complimentary-mounting-portion 149) is within two (2) inches of bottom-circular-edge 123.

In some embodiments, spring(s) 137 and/or mounting-tab(s) 143 are not attached to/at, associated with, nor in proximity to one or more of: flange(s), external flange(s), annular flange(s), mostly annular flange(s), reflector(s), trim, portions thereof, combinations thereof, and/or the like; wherein "associated with" and/or "in proximity to" in this context means a portion of spring(s) 137 (e.g., complimentary-mounting-portion 141) and/or of mounting-tab(s) 143 (e.g., complimentary-mounting-portion 149) is at least two (2) inches or more separated away from such structures.

In some embodiments, spring(s) 137 and/or mounting-tab(s) 143 are not attached to/at, associated with, nor in proximity to one or more of: lid 127, top 201, upper-portion 103, curved-segment(s) 105, planar-surface(s) 107, sloped-indentation(s) 109, knock-out(s) 111, hole(s)-for-conduit 129, portions thereof, combinations thereof, and/or the like; wherein "associated with" and/or "in proximity to" in this context means a portion of spring(s) 137 (e.g., complimentary-mounting-portion 141) when the spring(s) 137 are not being bent/squeezed and/or of mounting-tab(s) 143 (e.g., complimentary-mounting-portion 149) is at least a half (0.5) inch or more separated away from such structures.

In some embodiments, a spring 137 selected from the at least two springs 137 and a mounting-tab 143 selected from the at least two mounting-tabs 143 may be adjacent to each other and separated from each other by ninety (90) degrees along an exterior of lower-portion 121 of lighting-junction-box 101. See e.g., FIG. 1G and/or FIG. 1H.

In some embodiments, each of the at least two springs 137 may comprise elongate-leg-portion 139, and elongate-leg-portion 139 may be longer than a length (or a width) of extension-portion 145. See e.g., FIG. 1G and/or FIG. 1H.

Figure 2A:
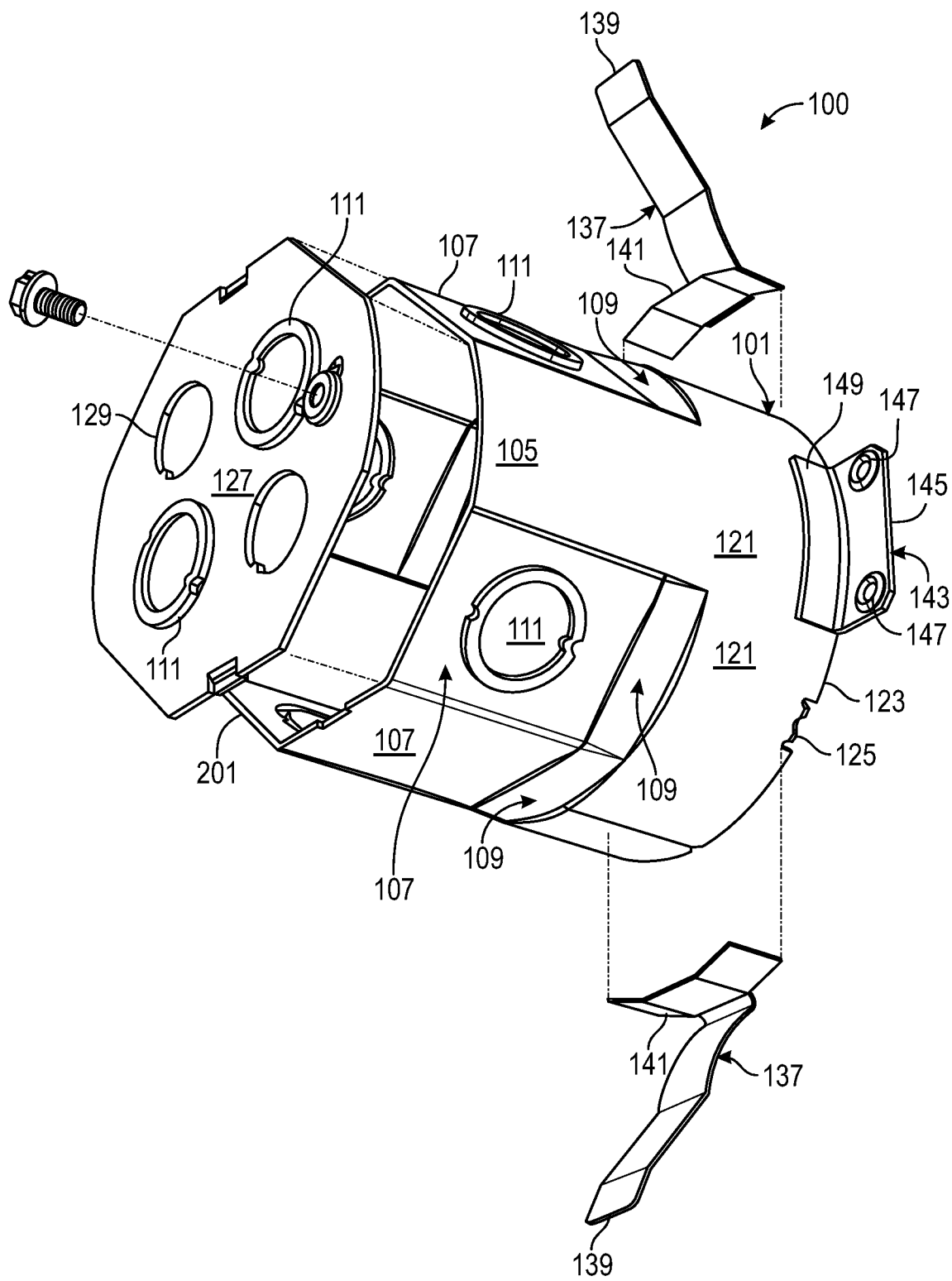
FIG. 2A depicts a partially exploded top perspective view of the lighting-junction-box-assembly-for-remodel of FIG. 1A.
Figure 2B:
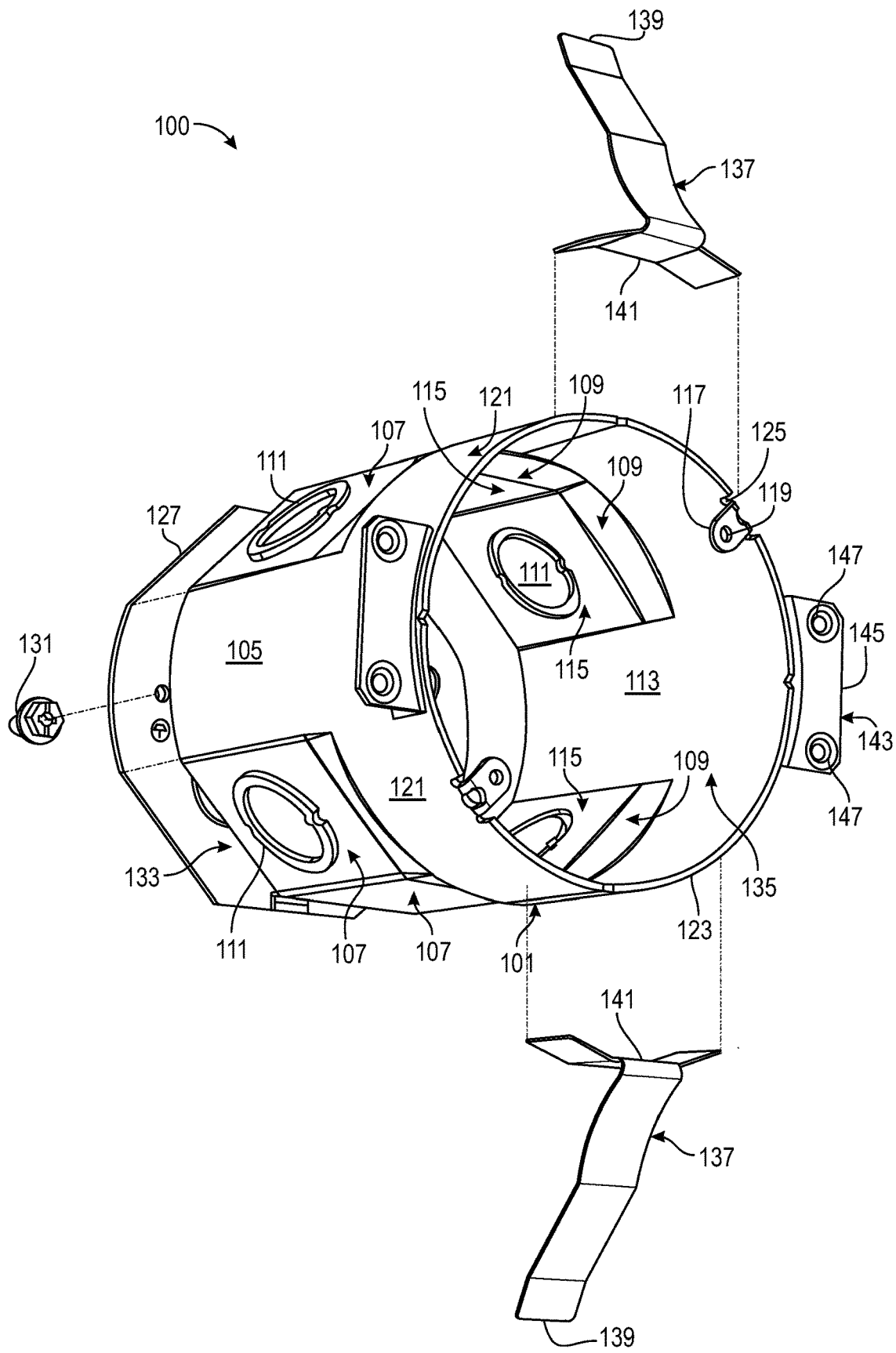
FIG. 2B depicts a partially exploded bottom perspective view of the lighting-junction-box-assembly-for-remodel of FIG. 1A.

FIG. 2A depicts a partially exploded top perspective view of assembly 100. FIG. 2B depicts a partially exploded bottom perspective view of assembly 100. FIG. 2A and FIG. 2B show: lid 127 exploded vertically away from top 201 of upper-portion 103; screw/bolt 131 exploded vertically away from lid 127; and springs 137 laterally exploded away from exterior sides of lower-portion 121. FIG. 2A and FIG. 2B show how upper-portion 103 and lower-portion 121 may be integral with each other, of a single article of manufacture.

Without lid 127 attached to a top 201 of upper-portion 103, upper-portion 103 and lower-portion 121 may form a hollow elongate structure (open at top 201 and at a bottom 123), with (side-wall) portions that are substantially (mostly) similar to a hollow right cylinder (see e.g., FIG. 2A and/or FIG. 2B).

In some embodiments, at least two or more of: upper-portion 103, curved-segments 105, planar-faces 107, sloped-indentations 109, holes-for-conduit 129 (of at least some planar-faces 107), lower-portion 121, bottom-circular-edge 123, and/or notch(es) 125 may be integral with each other and/or of a single article of manufacture; however, knock-out(s) 111 may be separate articles of manufacture that may be attached to at least some of the plana-faces 107. Lid 127 may also be a separate article of manufacture from upper-portion 103 and/or from lower-portion 121. Spring(s) 137 may also be a separate article(s) of manufacture from upper-portion 103 and/or from lower-portion 121. Mounting-tab(s) 143 may also be a separate article(s) of manufacture from upper-portion 103 and/or from lower-portion 121. See e.g., FIG. 2A and/or FIG. 2B.

In some embodiments, top 201 and/or lid 127 may be free from (without) any spring(s) 137 and/or mounting-tab(s) 143. See e.g., FIG. 2A and/or FIG. 2B.

Figure 3:
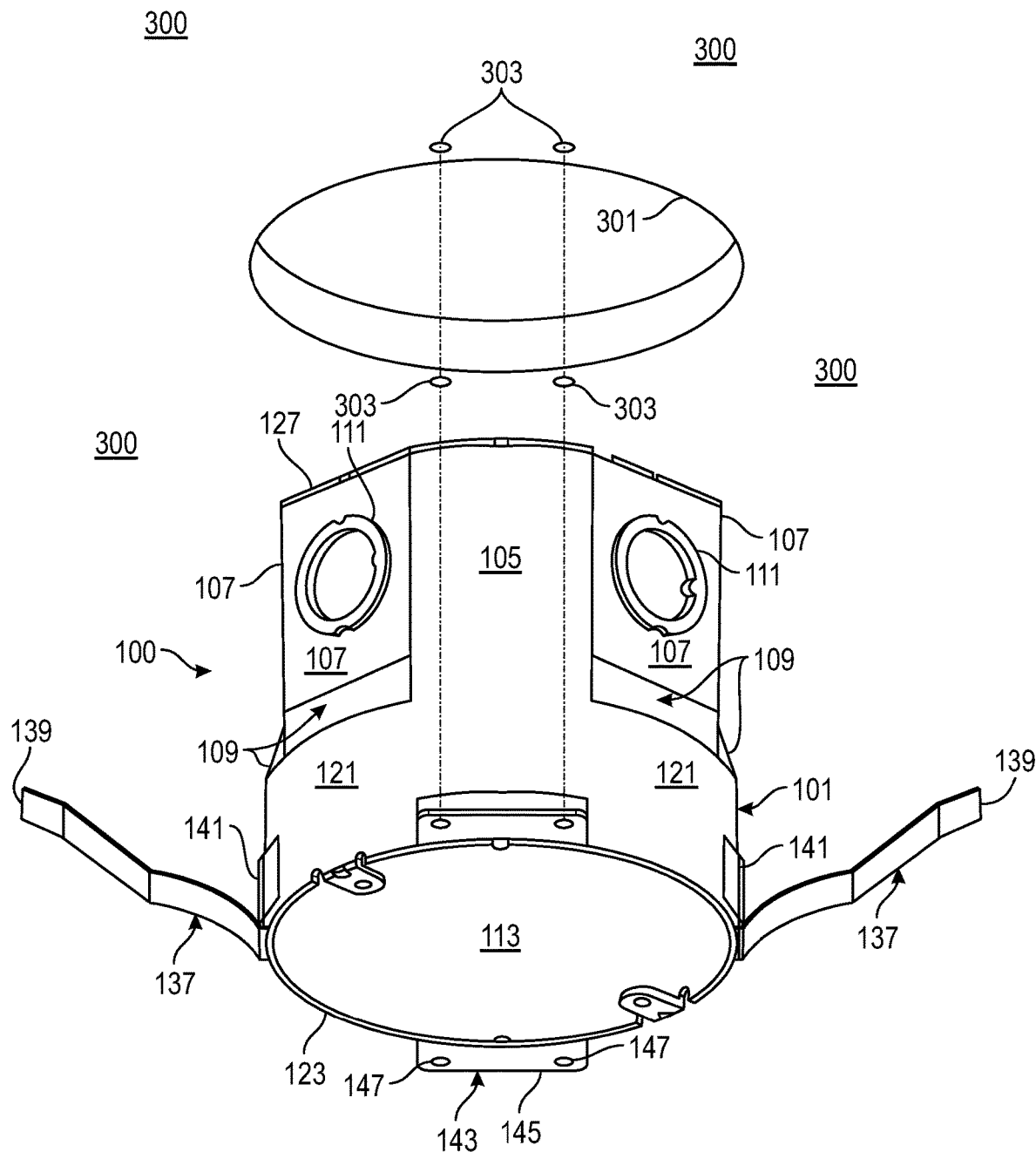
FIG. 3 depicts a bottom perspective view showing how a given lighting-junction-box-assembly-for-remodel of FIG. 1A may be installed into an existing ceiling.

FIG. 3 depicts a bottom perspective view showing how a given assembly 100 may be installed into an existing ceiling 300. In some embodiments, existing ceiling 300 may be made substantially from one or more of: drywall, sheetrock, gypsum board, wood, engineered lumber, plywood, OSB (oriented strand board), cement, concrete, metal, steel, aluminum, planks, panels, board, fiber board, plaster board, cement board, portions thereof, combinations thereof, and/or the like. For example, and without limiting the scope of the present invention, in some embodiments, existing ceiling 300 may be drywall of at least five-eighths (⅝) inches in (nominal/industry standard) thickness. With respect to a given existing ceiling 300, a circular hole may be formed (e.g., cut) into that ceiling 300 that is sized to receive an outside diameter (e.g., outside-diameter 153) of assembly 100 within that circle, wherein such a circle may be designated as cutout-for-junction-box 301. In some embodiments, an inside diameter of cutout-for-junction-box 301 may be larger than outside diameter (e.g., outside-diameter 153) of assembly 100. In some embodiments, for every hole 147 (of mounting-tab(s) 143 of assembly 100), a corresponding hole 303 may be formed (e.g., drilled) into that given existing ceiling 300. In some embodiments, hole(s) 147 may be vertical linear/straight alignment with hole(s) 303. In some embodiments, where there may be four (4) holes 147, then there may be four (4) holes 303, such that each hole 147 has a corresponding hole 303 in vertical linear/straight alignment as shown in FIG. 3. In some embodiments, hole 303 may be a hole for receiving a given mechanical fastener that secures mounting-tab(s) 143 to ceiling 300 and/or to drywall-anchor(s) that may be embedded within hole 303. See e.g., FIG. 3.

In some embodiments, to install a given assembly 100 into a given existing ceiling 300, cutout-for-junction-box 301 and hole(s) 303 are formed in the given existing ceiling 300. In some embodiments, template 400 (shown in FIG. 4) may be used to size and spatially place cutout-for-junction-box 301 and hole(s) 303 into the given existing ceiling 300. In some embodiments, cutout-for-junction-box 301 may be a circular hole sized as four (4) inches and three-eighths (⅜) inches in diameter. In other embodiments, a size of cutout-for-junction-box 301 may be different. In some embodiments, hole(s) 303 may be circular hole(s) of a size of three-sixteenths (3/16) inches in diameter. In other embodiments, a size of hole(s) 303 may be different. Then, elongate-leg-portion(s) 139 may be manually squeezed (by an installer's hands) towards lighting-junction-box 101 enough that at least most of assembly 100 may pass into cutout-for-junction-box 301; whereby manual squeezing of elongate-leg-portion(s) 139 may be released, and elongate-leg-portion(s) 139 may then squeeze against cutout-for-junction-box 301 and temporarily holding assembly 100 within cutout-for-junction-box 301. Then, mechanical fasteners may be used to secure mounting-tab(s) 143 to the given existing ceiling 300, by the mechanical fasteners passing through hole(s) 147 and through/into hole(s) 303. In some embodiments, once a given assembly 100 has been so mounted to given existing ceiling 300, mounting-tab(s) 143 may remain below a bottom exterior surface of the given existing ceiling 300. See e.g., FIG. 3. In some embodiments, cutout-for-junction-box 301 may also be referred to as largest-hole 301. In some embodiments, hole-for-mounting-tab-and-anchor 303 may also be referred to as smaller-hole 303.

In some embodiments, smaller-holes 303 may be in close proximity to largest-hole 301; and smaller-holes 303 and largest-hole 301 are all arranged in a predetermined pattern (e.g., as shown in template 400 of FIG. 4) with respect to each other. See e.g., FIG. 3 and FIG. 4.

Figure 4:
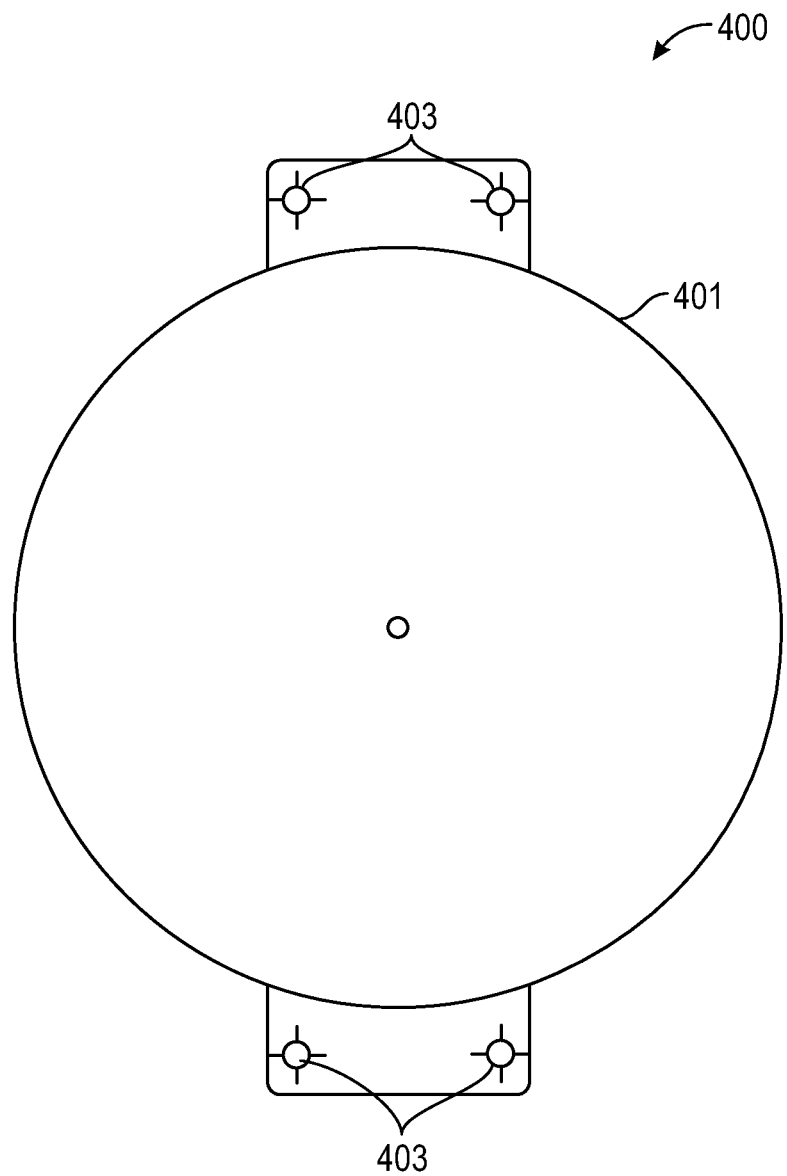
FIG. 4 depicts a plan view of a template for marking up an underside of an existing ceiling so that the marked-up region of the existing ceiling may receive installation of a given lighting-junction-box-assembly-for-remodel of FIG. 1A.

FIG. 4 depicts a plan view of a template 400, for marking up an underside of existing ceiling 300 so that the marked-up region of existing ceiling 300 may receive installation of a given assembly 100. In some embodiments, template 400 may be flatly attached to a bottom underside of existing ceiling 300, where a given assembly 100 may be desired to be installed within existing ceiling 300. In some embodiments, template 400 may be used to form the ceiling 300 holes shown in FIG. 3. In some embodiments, template 400 may comprise template-for-cutout-for-junction-box 401 and template-for-hole-for-mounting-plate-and-anchor 403. In some embodiments, template-for-cutout-for-junction-box 401 and template-for-hole(s)-for-mounting-plate-and-anchor 403 may be circles of at least two different sizes. In some embodiments, template-for-cutout-for-junction-box 401 may be a circle size of four (4) inches and three-eighths (⅜) inches in diameter. In other embodiments, a size of template-for-cutout-for-junction-box 401 may be different. In some embodiments, template-for-hole(s)-for-mounting-plate-and-anchor 403 may be circle(s) of a size of three-sixteenths (3/16) inches in diameter. In other embodiments, a size of template-for-hole-for-mounting-plate-and-anchor 403 may be different. In some embodiments, template-for-cutout-for-junction-box 401 may be used to form (e.g., cutout) cutout-for-junction-box 301. In some embodiments, template-for-hole(s)-for-mounting-plate-and-anchor 403 may be used to form (e.g., drill) hole(s) 303. In some embodiments, template-for-cutout-for-junction-box 401 may be larger in diameter than diameters of template-for-hole(s)-for-mounting-plate-and-anchor 403. In some embodiments, template-for-cutout-for-junction-box 401 may be centered between two set of opposing holes template-for-hole(s)-for-mounting-plate-and-anchor 403, wherein each such set of template-for-hole(s)-for-mounting-plate-and-anchor 403 may have two template-for-hole(s)-for-mounting-plate-and-anchor 403 (so there may be four (4) template-for-hole(s)-for-mounting-plate-and-anchor 403 in total). See e.g., FIG. 4 for template 400 and its circles 401/403. In some embodiments, template-for-cutout-for-junction-box 401 may also be referred to as largest-circle 401. In some embodiments, template-for-hole-for-mounting-plate-and-anchor 403 may also be referred to as smaller-circle 403. In some embodiments, template 400 may be a substantially (mostly) flat and planar sheet. In some embodiments, template 400 may be a substantially (mostly) made from paper, card stock, cardboard, plastic, sheeting material that is easy to cut (e.g., cuttable with hand-held scissors), portions thereof, combinations thereof, and/or the like.

Continuing discussing FIG. 4, in some embodiments, single-largest-circle 401 may be centered in template 400, with two smaller-circles 403 placed above and outside of single-largest-circle 401 at a same distance from a center of single-largest-circle 401; and wherein two additional smaller-circles 403 are placed below and outside of single-largest-circle 401, also at that same distance from the center of single-largest-circle 401; such that there are a total of four (4) smaller-circles 403, two (2) above single-largest-circle 401 and two (2) below single-largest-circle 401. In some embodiments, this pattern of circles of template 400 directly corresponds (and at a same scale) to a pattern of outside-diameter 153/bottom-circular-edge 123 and holes 147 of assembly 100, except that single-largest-circle 401 is slightly larger than outside-diameter 153.

In some embodiments, if imaginary four (4) lines were to connect the four (4) template-for-hole-for-mounting-plate-and-anchor 403 (smaller-circles 403), a rectangle shape, with rounded corners may be formed. See e.g., FIG. 4. In some embodiments, that rectangle shape, may share a center with axial-centerline 199. In some embodiments, a length of that rectangle shape may be at least substantially (mostly) orthogonal/perpendicular to an imaginary line running between the two opposing springs 137. See e.g., FIG. 4 and FIG. 1H.

Figure 5:
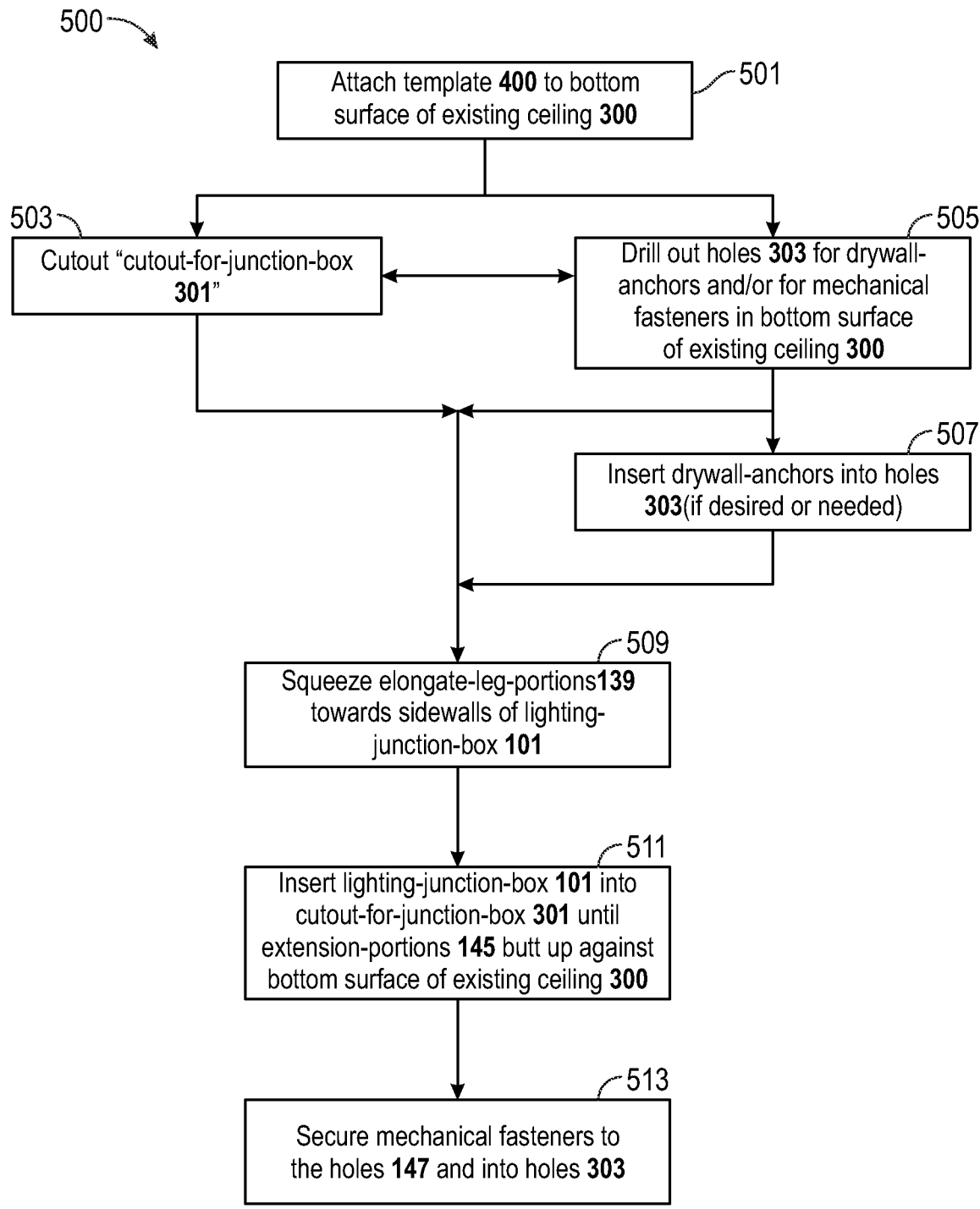
FIG. 5 may depict a flowchart of a method of retrofitting an existing ceiling with a lighting-junction-box-assembly-for-remodel installed within that existing ceiling.

FIG. 5 may depict a flowchart of a method 500. FIG. 5 may depict at least some steps of method 500 in a flowchart. In some embodiments, method 500 may be a method of retrofitting existing ceiling 300 with assembly 100 installed therein. In some embodiments, method 500 may comprise at least one of the following steps: 501, 503, 505, 507, 509, 511, 513, portions thereof, combinations thereof, and/or the like. In some embodiments, method 500 at a minimum may comprise steps: 503, 505, 509, 511, and 513; wherein step 501 may be optional; and/or step 507 may be executed as desired or necessary depending upon existing ceiling 300 strength characteristics and/or whether or not any structural members are behind hole(s) 303. In some embodiments, method 500 may begin with either step 503 or with step 505, but both the steps 503 and 505 must be executed prior to executing the steps 509 through 513. In some embodiments, method 500 may begin with step 501, with step 503, or with step 505, but both the steps 503 and 505 must be executed prior to executing the steps 509 through 513. In some embodiments, at least one of these steps may be omitted from method 500. In some embodiments, at least some of these steps may be executed out of numerical order.

Continuing discussing FIG. 5, in some embodiments, step 501 may be a step of attaching template 400 to a bottom surface of existing ceiling 300, at a location of 300 wherein one plans to install a given assembly 100. In some embodiments, prior to executing steps 503 through 513, method 500 may comprise step 501 of attaching template 400 to a bottom surface of existing ceiling 300, wherein template 400 may comprise a single-largest-circle 401 and smaller-circles 403, wherein single-largest-circle 401 may be used to size largest-hole 301, and wherein smaller-circles 403 may be used to size smaller-holes 303. For example, and without limiting the scope of the present invention, tape and/or tacks may be used to attach template 400 to the bottom surface of existing ceiling 300. In some embodiments, smaller-holes 303 may be in close proximity to largest-hole 301; and smaller-holes 303 and largest-hole 301 are all arranged in a predetermined pattern (e.g., as shown in template 400 of FIG. 4) with respect to each other. In some embodiments, step 501 may be omitted from method 500. In some embodiments, step 501 may progress to step 503 and/or to step 505.

Continuing discussing FIG. 5, in some embodiments, step 503 may be a step of cutting out cutout-for-junction-box 301 in the bottom surface of existing ceiling 300. In some embodiments, step 503 may be a step of cutting a largest-hole 301 within existing ceiling 300, wherein largest-hole 301 may be sized to fit an outside-diameter of lighting-junction-box-assembly 100. A saw selected from various saws may be used to execute step 503. For example, and without limiting the scope of the present invention, if existing ceiling 300 may be drywall, then a drywall hand saw, a jigsaw, a drill with circular saw bit, a drill with hole bit, and/or the like may be used to form cutout-for-junction-box 301. In some embodiments, cutout-for-junction-box 301 may have a diameter of four and three-eights (4⅜) inches; whereas, in other embodiments, cutout-for-junction-box 301 may have a different sized diameter. In some embodiments, template-for-cutout-for-junction-box 401 from template 400 may be used to assist in forming cutout-for-junction-box 301; whereas, in other embodiments, cutout-for-junction-box 301 may be formed without use of template-for-cutout-for-junction-box 401 and just using an appropriate sized hole saw in the bottom surface of existing ceiling 300. In some embodiments, step 503 may progress to step 505 and/or to step 509. Note, in some embodiments, step 503 may only progress to step 509, if step 505 has already been executed.

Continuing discussing FIG. 5, in some embodiments, step 505 may be a step of drilling out holes 303 for drywall-anchors and/or for mechanical fasteners in the bottom surface of existing ceiling 300. In some embodiments, step 505 may be a step of drilling smaller-holes 303 within existing ceiling 300, wherein smaller-holes 303 may be configured for receiving mechanical fasteners and/or for receiving drywall-anchors. In some embodiments, step 505 may be executed with a drill, driver, and/or appropriately sized drill bits. In some embodiments, four (4) such holes 303 may be formed in step 505. In some embodiments, a three-sixteenths (3/16) inch drill bit (along with a drill) may be used for drill out hole(s) 303 in the bottom surface of existing ceiling 300; whereas, in other embodiments, a different sized drill bit may be used to form hole(s) 303 depending upon an inside diameter of hole(s) 147.

In some embodiments, template-for-hole-for-mounting-plate-and-anchor 403 from template 400 may be used to assist in forming hole(s) 303; whereas, in other embodiments, hole(s) 303 may be formed without use of template-for-hole-for-mounting-plate-and-anchor 403 and just using an appropriate sized drill bit in the bottom surface of existing ceiling 300 and using hole(s) 147 as a template of where to locate those hole(s) 303. In some embodiments, step 505 may progress to step 507 and/or to step 509. Note, in some embodiments, step 505 may only progress to step 509, if step 503 has already been executed.

Continuing discussing FIG. 5, in some embodiments, step 507 may be a step of inserting drywall-anchors into holes 303 (formed from step 505) (if desired or needed). In some embodiments, after executing step 505 but before executing step 509, method 500 may comprise step 507 of inserting at least one drywall-anchor into at least one of the smaller-holes 303. In some embodiments, the drywall-anchors may be sized appropriately for one or more of: a thickness of drywall of ceiling 300, a weight of assembly 100, and/or a weight of the lighting module (and trim) installed at least partially within assembly 100. For example, and without limiting the scope of the present invention, the drywall-anchors may be sized for certain weight requirements, such as, but not limited to, 25 pounds, 50 pounds, 75 pounds, and/or the like. For example, and without limiting the scope of the present invention, the drywall-anchors may be a commercially available drywall-anchor that is configured to fit into a hole within drywall and then receive a mechanical fastener (e.g., a screw) into the drywall-anchor. In some embodiments, step 507 may be omitted in method 500. In some embodiments, step 507 may be unnecessary; e.g., when a location for a given hole 303 may be backed by some structural member (e.g., a joist, a stud, wood, lumber, engineered lumber, metal, steel, concrete, cement, masonry, and/or the like). In some embodiments, step 507 may progress to step 509.

Continuing discussing FIG. 5, in some embodiments, step 509 may be a step of squeezing elongate-leg-portions 139 towards sidewalls of lighting-junction-box 101. In some embodiments, step 509 may be a step of squeezing (e.g., manually by hand) elongate-leg-portions 139 of springs 137 of the lighting-junction-box-assembly 100 towards sidewalls of the lighting-junction-box-assembly 101. In some embodiments, step 509 may be executed solely by the installer's hand(s); i.e., spring(s) 139 squeezing may be done by human hands. In some embodiments, step 509 may progress to step 511. Note, execution of step 509 may overlap with execution of step 511.

Continuing discussing FIG. 5, in some embodiments, step 511 may be a step of inserting lighting-junction-box 101 (while simultaneously still executing step 509) into cutout-for-junction-box 301 (made in step 503) until extension-portions 145 physically butt up against the bottom surface of existing ceiling 300. In some embodiments, while step 509 is still being executed, step 511 may be a step of inserting at least most of lighting-junction-box-assembly 100 into largest-hole 301. Once step 511 is executed, squeezing of elongate-leg-portions 139 towards sidewalls of lighting-junction-box 101 may no longer be possible; however, the inside diameter of cutout-for-junction-box 301 may now butt up against some underside portion of elongate-leg-portions 139 so that assembly 100 may be frictionally held within cutout-for-junction-box 301 (at least temporarily until step 513 may be executed). Note, not all of assembly 100 may be entirely located within cutout-for-junction-box 301 once step 511 has been executed; e.g., extension-portion(s) 145 may reside outside of cutout-for-junction-box 301 once step 511 has been executed. In some embodiments, when step 511 may be completed, top/upper surfaces of extension-portions 145 may butt physically up against a bottom surface of existing ceiling 300. Extension-portions 145 may not fit into hole 301 (cutout 301/largest-hole 301). In some embodiments, once assembly 100 may be installed within hole 301 (cutout 301/largest-hole 301) (e.g., after execution of step 513), trim, plaster, mud, and/or paint may cover up extension-portions 145. In some embodiments, step 511 may progress to step 513.

Continuing discussing FIG. 5, in some embodiments, step 513 may be a step of securing mechanical fasteners to the holes 147 and then with portions of those mechanical fasteners also going into holes 303 (and into any drywall-anchors, if present in hole(s) 303). In some embodiments, step 513 may be a step of securing the mechanical fasteners to extension-portions 145 (e.g., by use of hole(s) 147) of lighting-junction-box-assembly 100 and to smaller-holes 303. In some embodiments, the mechanical fasteners used in step 513 may be selected from one or more of: a screw, a bolt, a rivet, a nail, a brad, a tack, a pin, portions thereof, combinations thereof, and/or the like. Upon completion of step 513, assembly 100 may be securely installed within cutout-for-junction-box 301 of existing ceiling 300.

In some embodiments, assembly 100 and/or at least a portion thereof may be at least mostly (substantially) made from one or more materials of: a metal, an alloy, plastic, carbon fiber, ceramic, wood, portions thereof, combinations thereof, and/or the like. In some embodiments, assembly 100 and/or at least a portion thereof may be at least mostly (substantially) made from one or more materials approved by a regulatory agency and/or law that may be applicable to where a given assembly 100 may be planned to be installed.

In some embodiments, exterior surfaces of assembly 100 and/or at least a portion thereof may be painted and/or powder coated.

Note with respect to the materials of construction, it is not desired nor intended to thereby unnecessarily limit the present invention by reason of such disclosure.

In some embodiments, assembly 100 may be IC (insulation contact) rated. In some embodiments, assembly 100 may be configured for use in IC (insulation contact) and/or non-IC applications. In some embodiments, assembly 100 may be IC (insulation contact) rated airtight for direct contact with insulation.

In some embodiments, a maximum two (2) hour fire rated ceiling assembly may be maintained when assembly 100 may be installed according to the International Building Code, Section 714.

In some embodiments, assembly 100 may be UL (Underwriters' Laboratories) listed under UL 514A Standards as a metallic outlet box. In some embodiments, assembly 100 may be UL listed under 1598 Standards as a luminaire housing.

In some embodiments, assembly 100 may be configured for use in damp locations and/or potentially in wet locations.

In some embodiments, assembly 100 may be low profile, making assembly 100 ideal for use in shallow plenum applications. For example, and without limiting the scope of the present invention, assembly 100 may have a height of four (4) inches (e.g., from bottom-circular-edge 123 to a top of lid 127.

In some embodiments, extension-portion(s) 145 may not be completely covered by trim; i.e., mudding, plastering, and/or painting may be desired, required, and/or necessary after installation of assembly 100 into existing ceiling 300.

A lighting-junction-box-assembly-for-remodel has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A lighting-junction-box-assembly configured for installation into a ceiling, wherein the lighting-junction-box-assembly comprises:
    a lighting-junction-box that is configured for at least housing a portion of a lighting module within a cavity of the lighting-junction-box, wherein the lighting-junction-box comprises a main-opening to the cavity located at a bottom of the lighting-junction-box;
    at least two springs attached to the lighting-junction-box, wherein each of the at least two springs has a distal end that points away from side-walls of the lighting-junction-box, but wherein the distal end does at least partially point upwards from the bottom of the lighting-junction-box towards a top of lighting-junction-box, wherein each of the at least two springs is configured to frictionally engage interior sides of a hole within the ceiling, wherein that hole is sized to fit at least most of the lighting-junction-box within an inside diameter of that hole; and
    at least two mounting-tabs attached to the lighting-junction-box, wherein each of the at least two mounting-tabs has an extension-portion that points away from the lighting-junction-box, wherein each of the at least two mounting-tabs is configured for facilitating attachment to the ceiling;
    wherein the distal ends of the at least two springs and the extension-portions of the at least two mounting-tabs all point in different directions from each other;
    wherein the at least two springs are shaped differently from the at least two mounting-tabs;
    wherein both the at least two springs and the at least two mounting-tabs are attached to the lighting-junction-box at locations on a lower-portion of the lighting-junction-box that are closest to the bottom and furthest away from the top.

2. The lighting-junction-box-assembly according to claim 1, wherein each of the at least two springs comprises an elongate-leg-portion that is longer than wide and wider than thick, and wherein the elongate-leg-portion terminates at the distal-end.

3. The lighting-junction-box-assembly according to claim 2, wherein the elongate-leg-portion has an overall length that is not parallel nor orthogonal with an axial-centerline of the lighting-junction-box, when the elongate-leg-portion is in a default resting relaxed configuration.

4. The lighting-junction-box-assembly according to claim 2, wherein the elongate-leg-portion has a predetermined rigidity that is configured to be temporarily squeezed into a squeezed configuration towards the side-walls of the lighting-junction-box and when not being squeezed the elongate-leg-portion is in a default resting relaxed configuration.

5. The lighting-junction-box-assembly according to claim 4, wherein when both of the elongate-leg-portions are in the squeezed configuration, the lighting-junction-box-assembly is configured to fit at least mostly within the hole in the ceiling.

6. The lighting-junction-box-assembly according to claim 1, wherein each of the at least two springs comprises a complimentary-mounting-portion that is attached to the lower-portion of the lighting-junction-box.

7. The lighting-junction-box-assembly according to claim 6, wherein the two complimentary-mounting-portions are oppositely disposed from each other on the lower-portion of the lighting-junction-box.

8. The lighting-junction-box-assembly according to claim 1, wherein the extension-portion extends orthogonally away from an axial-centerline of the lighting-junction-box.

9. The lighting-junction-box-assembly according to claim 1, wherein each of the at least two mounting-tabs comprises a complimentary-mounting-portion that is attached to the lower-portion of the lighting-junction-box.

10. The lighting-junction-box-assembly according to claim 9, wherein the two complimentary-mounting-portions are oppositely disposed from each other on the lower-portion of the lighting-junction-box.

11. The lighting-junction-box-assembly according to claim 1, wherein the extension-portion comprises at least one through-hole, wherein the at least one through-hole is configured to receive a mechanical fastener for attachment to the ceiling.

12. The lighting-junction-box-assembly according to claim 1, wherein a spring selected from the at least two springs and a mounting-tab selected from the at least two mounting-tabs are adjacent to each other and separated from each other by ninety (90) degrees along an exterior of the lower-portion of the lighting-junction-box.

13. The lighting-junction-box-assembly according to claim 1, wherein each of the at least two springs comprises an elongate-leg-portion that is longer than the extension-portion.

14. The lighting-junction-box-assembly according to claim 1, wherein the lighting-junction-box comprises a lid and also comprises the side-walls that at least mostly circumscribe the cavity around all boundaries of the cavity except at the bottom of the lighting-junction-box, wherein the lid and the side-walls are at least mostly solid closed structures, wherein the main-opening at the bottom of the lighting-junction-box is at least mostly open providing access to the cavity.

15. A method for retrofitting an existing ceiling with a lighting-junction-box-assembly, wherein the method comprises steps of:
    (a) cutting a largest-hole within the existing ceiling, wherein the largest-hole is sized to fit an outside-diameter of the lighting-junction-box-assembly therein;
    (b) drilling smaller-holes within the existing ceiling, wherein the smaller-holes are configured for receiving mechanical fasteners;
    (c) squeezing elongate-leg-portions of springs of the lighting-junction-box-assembly towards side-walls of the lighting-junction-box-assembly;
    (d) while step (c) is still being executed, inserting at least most of the lighting-junction-box-assembly into the largest-hole; and
    (e) securing the mechanical fasteners to extension-portions of mounting-tabs of the lighting-junction-box-assembly to the smaller-holes;
        wherein both the springs and the mounting-tabs are attached to a lighting-junction-box, of the lightingjunction-box-assembly, at locations on a lower-portion of the lighting-junction-box that are closest to a bottom and furthest away from a top of the lighting-junction-box.

16. The method according to claim 15, wherein prior to executing the steps (a) through (e), the method further comprises a step of attaching a template to a bottom surface of the existing ceiling, wherein the template comprises a single-largest-circle and smaller-circles, wherein the single-largest-circle is used to size the largest-hole, and wherein the smaller-circles are used to size the smaller-holes.

17. The method according to claim 15, wherein after executing the step (b) but before executing the step (c), the method further comprises a step of inserting at least one drywall-anchor into at least one of the smaller-holes, wherein the ceiling is made at least substantially of drywall.

18. The method according to claim 15, wherein when the step (d) is completed, top surfaces of the extension-portions butt physically up against a bottom surface of the existing ceiling.

19. The method according to claim 15, wherein the smaller-holes are in close proximity to the largest-hole; and the smaller-holes and the largest-hole are all arranged in a predetermined pattern with respect to each other.

20. The method according to claim 15, wherein the method begins with either the step (a) or the step (b), but both the steps (a) and (b) must be executed prior to executing the steps (c) through (e).

\* \* \* \* \*